(12) United States Patent
Looney

(10) Patent No.: US 11,492,933 B2
(45) Date of Patent: Nov. 8, 2022

(54) VALVE TIMING SYSTEM AND METHOD

(71) Applicant: LSE R&D ENGINEERING LIMITED, Kowloon (HK)

(72) Inventor: Allen Eugene Looney, Kowloon (HK)

( * ) Notice: Subject to any disclaimer, the term of this patent is extended or adjusted under 35 U.S.C. 154(b) by 0 days.

(21) Appl. No.: 17/572,074

(22) Filed: Jan. 10, 2022

(65) Prior Publication Data

US 2022/0127979 A1    Apr. 28, 2022

Related U.S. Application Data

(62) Division of application No. 16/509,156, filed on Jul. 11, 2019, now Pat. No. 11,220,934.
(Continued)

(51) Int. Cl.
*F01L 7/18* (2006.01)
*F01L 7/14* (2006.01)
(Continued)

(52) U.S. Cl.
CPC .................. *F01L 7/18* (2013.01); *F01L 1/026* (2013.01); *F01L 1/12* (2013.01); *F01L 1/267* (2013.01); *F01L 7/06* (2013.01); *F01L 7/14* (2013.01); *F02F 1/22* (2013.01); *F02F 7/0043* (2013.01); *F16H 1/06* (2013.01)

(58) Field of Classification Search
CPC ..... F01L 7/00; F01L 7/02; F01L 7/026; F01L 7/029; F01L 7/04; F01L 7/06; F01L 7/14; F01L 7/18; F01L 5/04; F01L 5/06; F01L 1/00; F01L 1/026; F01L 1/12;
(Continued)

(56) References Cited

U.S. PATENT DOCUMENTS 1,766,101 A    6/1930 Bowen
3,522,797 A    8/1970 Stinebaugh
(Continued)

FOREIGN PATENT DOCUMENTS

DE    19931129 A1    1/2000
GB    2465188 A    5/2010

OTHER PUBLICATIONS

R. Shriram et al., Design and Development of Camless Valve Train for I.C. Engines, Article, International Review of Mechanical Engineering vol. 6, N. 5, 6 pages,© 2012, Praise Worthy Prize.
(Continued)

*Primary Examiner* — Grant Moubry
*Assistant Examiner* — James Moubry
(74) *Attorney, Agent, or Firm* — Kevin Mark Klughart

(57) ABSTRACT

In an internal combustion engine, first and second rotating members, one for the intake valve and one for the exhaust valve rotate next to the outside of an engine cylinder on opposite sides thereof when driven by a drive gear attached to the end of the engine's crankshaft. Each rotating member may include a ring gear having a valve port or aperture near its perimeter that cyclically aligns with a corresponding valve port formed through the cylinder wall near the top of the cylinder. A method of controlling valve timing comprises the steps of causing the rotating member containing the second valve port to periodically align in synchronism with the first port to control the passage of an air/fuel mixture and exhaust gases through the combustion cycles of the engine.

20 Claims, 37 Drawing Sheets

Related U.S. Application Data

(60) Provisional application No. 62/697,183, filed on Jul. 12, 2018.

(51) Int. Cl.
*F01L 7/00* (2006.01)
*F02F 1/22* (2006.01)
*F02F 7/00* (2006.01)
*F01L 1/02* (2006.01)
*F01L 1/12* (2006.01)
*F01L 1/26* (2006.01)
*F16H 1/06* (2006.01)
*F01L 7/06* (2006.01)

(58) Field of Classification Search
CPC . F01L 1/267; F02F 1/22; F02F 7/0043; F16H 1/12; F16H 1/00
See application file for complete search history.

(56) References Cited

U.S. PATENT DOCUMENTS

| | | |
|---|---|---|
| 4,163,438 A | 8/1979 | Guenther et al. |
| 4,373,476 A | 2/1983 | Vervoordt et al. |
| 4,494,500 A | 1/1985 | Hansen |
| 4,879,979 A | 11/1989 | Triguero |
| 5,535,715 A | 7/1996 | Mouton |
| 5,967,108 A | 10/1999 | Kutlucinar |
| 5,988,133 A | 11/1999 | Agapiades et al. |
| 6,390,048 B1 | 5/2002 | Luchansky |
| 6,467,455 B1 | 10/2002 | Posh |
| 6,578,538 B2 | 6/2003 | Trantham |
| 6,591,794 B2 | 7/2003 | Toda |
| 7,140,342 B1 | 11/2006 | Murray |
| 7,421,995 B2 | 9/2008 | Zajac et al. |
| 7,685,986 B2 | 3/2010 | Agapiades |
| 9,194,264 B2 | 11/2015 | Khajepour et al. |
| 2008/0017150 A1* | 1/2008 | Tsuchida ............ F16H 9/18 123/90.17 |
| 2008/0224418 A1* | 9/2008 | Lawes ................ F01L 7/16 277/591 |

OTHER PUBLICATIONS

Wikipedia webpages, Two-Stroke (or two-cycle) Engine, 15 pages n.m.wikipedia.org/wiki/Two-stroke_engine, Jun. 17, 2019.
Subhash Chandar et al., "Design of a Camless Rotating Cylinder Engine," 3 pages, Abstract, International Journal of Emerging Technology, Jan. 2010.
PCT/US2019/041534 International Search Report and Written Opinion, dated Oct. 1, 2019, 13 pages.

* cited by examiner

VALVE TIMING SYSTEM AND METHOD

CROSS REFERENCE TO RELATED APPLICATIONS

This patent application is a Divisional Patent Application (DPA) of and includes by reference parent United States Utility Patent Application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022 Jan. 11.

Provisional Patent Applications

United States Utility Patent Application for INTAKE AND EXHAUST VALVE SYSTEM FOR AN INTERNAL COMBUSTION ENGINE by inventor Allen Eugene Looney, filed with the USPTO on 2019 Jul. 11, with Ser. No. 16/509,156, EFS ID 36560751, confirmation number 1060, issued as U.S. Pat. No. 11,220,934 on 2022 Jan. 11, claims benefit under 35 U.S.C. § 119 and incorporates by reference United States Provisional Patent Application for VALVE SYSTEM FOR AN INTERNAL COMBUSTION ENGINE by inventor Allen Eugene Looney, filed electronically with the USPTO on 2018 Jul. 12, with Ser. No. 62/697,183, EFS ID 33164853, confirmation number 3188.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present application relates generally to internal combustion engines and particularly to apparatus and methods for control of the intake and exhaust valve systems of it internal combustion engines.

BACKGROUND AND PRIOR ART

An internal combustion engine admits a combustible mixture, usually air and a fuel such as gasoline or a blend of gasoline and ethanol into a dosed chamber to be ignited by an energetic impulse such as an electric spark. In the case of diesel engines, ignition occurs when the incoming air is heated by compression and mixed with fuel injected into the combustion chamber. The expansion of the ignited fuel forces movement of a piston or other component coupled through reciprocating or rotary motion to cause cyclic rotation of an output shaft called a crankshaft. The rotating crankshaft may be coupled through a transmission or driveshaft to provide motive force to a machine such as a vehicle or appliance. The output of the engine may be controlled by adjusting the air/fuel mixture inlet into the combustion chamber.

In the design of internal combustion engines, there are three kinds of timing functions that must be satisfied: (1) timing the valves that control the passage of air into and exhaust gases out of the combustion chamber; (2) timing the injection of fuel into the air/fuel mixture or into the combustion chamber, and (3) timing the spark or other energetic impulse that provides ignition of the air/fuel mixture in the combustion chamber.

The conventional types of apparatus for the intake and exhaust valve systems for internal combustion engines are well known, including camshaft-controlled reciprocating poppet-valve mechanisms wherein the spring-loaded valves activated by a camshaft embedded in the engine block and driven by a gear attached to the crankshaft that meshes with a gear attached to the camshaft. Alternatively, the camshaft may be located outside the engine block and driven by a toothed belt and pulley configuration synchronized with the crankshaft. The camshaft has precisely-shaped lobes that convert the rotary motion of the camshaft to linear motion through a mechanical system of lifters, push rods, and rocker arms mounted on the cylinder head to the valve stems (a so-called "valve train") that reciprocate in valve guide passages through the cylinder head. The poppet valves on the opposite end of the valve stems are held closed under spring tension until the camshaft lobe raises the lifter in a motion imparted through the valve train to open the valve. Alternatively, the camshaft may be mounted on the cylinder head directly above the valves where the lobes on the camshaft can directly contact the valve stem or an intervening valve lifter. The camshaft may be driven by a chain or belt coupled to a sprocket or pulley attached to the crankshaft. These types of poppet valve trains are complex, have many precision moving parts of relatively high mass subject to reciprocating motion and wear, and require substantial maintenance.

Other valve systems such as rotary valves where the valve member is rotated through a mechanism to move a valve passage into alignment with inlet or outlet passages are conceptually among the simplest valve systems, finding uses in applications ranging from water faucets to brass horn instruments, and even to some types of engines. While such valve systems can be simpler than the inefficient and complex reciprocating mechanisms for operating intake and exhaust valves, conventional designs still involve mechanisms subject to a variety of problems. What is needed is a conceptually simple mechanism for operating the intake and exhaust valves of an internal combustion engine that is efficient, practical, and cost effective.

BRIEF SUMMARY OF THE INVENTION

A valve system for an internal combustion piston engine having a crankshaft rotatably mounted in a crankcase portion of an engine block, and an engine cylinder formed within the engine block and open at a lower end thereof into the crankcase, comprising a first port disposed through a side wall of the engine cylinder into an upper portion of the engine cylinder; and a second port disposed through a rotating port member along one radius of the rotating port member; wherein the rotating port member is disposed to rotate alongside the side wall of the engine cylinder such that the second port and the first port are in a communicating alignment keyed to revolution of the crankshaft. The system preferably includes at least one rotating drive member for coupling the rotation of the crankshaft to rotation of the rotating port member to control timing of the communicating alignment of the first and second ports.

In one aspect, the at least one rotating drive member comprises a ring gear attached to the crankshaft and aligned with the axis of the crankshaft and having a plurality of gear teeth around the ring gear that mesh with corresponding teeth formed around the rotating port member. In this aspect the number of gear teeth around the rotating drive member equals half the number of gear teeth disposed around the rotating port member such that the rotating drive member rotates two complete revolutions for each revolution of the rotating port member for four cycle operation. In an alternate aspect, the number of gear teeth around the rotating drive member equals the number of gear teeth disposed around the rotating port member such that the rotating drive member rotates one complete revolution for each revolution of the rotating port member for two cycle operation.

In second embodiment, the rotating port member comprises a rotating disc having a plurality of gear teeth disposed around the perimeter of the disc, and a cylindrically-formed ring having first and second parallel edges and coaxially attached at the first edge thereof to a side of the rotating disc facing the engine cylinder, wherein the second port is formed in the ring between the first and second parallel edges. In this embodiment, the first port comprises a first aperture disposed through a portion of a top side of the engine cylinder disposed opposite the open end of the engine cylinder, a second aperture is disposed in the cylindrically-formed ring, the second aperture having a shape and size that corresponds with the first port when the first and second ports are in communicating alignment; and the top side of the engine cylinder is a cylinder head.

In one aspect of the second embodiment, the at least one rotating drive member comprises a ring gear attached to the crankshaft aligned with the axis of the crankshaft and having a plurality of gear teeth around the ring gear that mesh with corresponding teeth formed around the rotating port member. In this aspect the number of gear teeth around the rotating drive member equals half the number of gear teeth disposed around the rotating port member such that the at least one rotating drive member rotates two complete revolutions for each revolution of the rotating port member for four cycle operation. In an alternate aspect the number of gear teeth around the rotating drive member equals the number of gear teeth disposed around the rotating port member such that the at least one rotating drive member rotates one complete revolution for each revolution of the rotating port member for two cycle operation.

BRIEF DESCRIPTION OF THE DRAWINGS

FIG. 8 illustrates four views, FIG. 17, FIG. 18, FIG. 19, and FIG. 20, of a multi-stage valve system for use in the embodiment of FIG. 11;

DETAILED DESCRIPTION OF THE INVENTION

Figure 1:
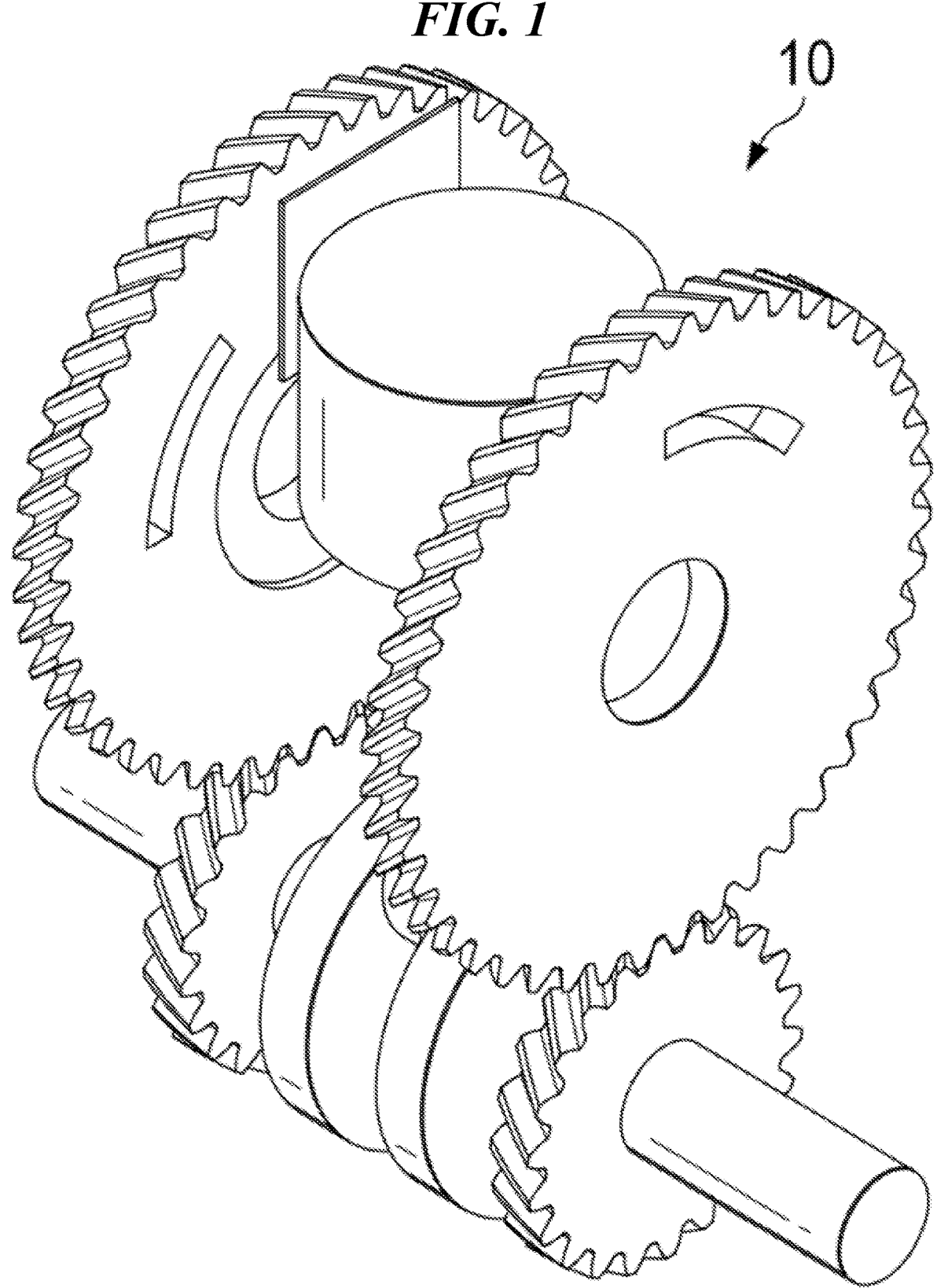
FIG. 1, FIG. 2, FIG. 3, FIG. 4, FIG. 5, FIG. 6, FIG. 7, FIG. 8, FIG. 9, FIG. 10 illustrate isometric views depicting several members of the family of embodiments of the present invention.

In an advance in the state of the art, the disclosed invention eliminates the conventional camshaft and reciprocating valve train to control the timing of the intake and exhaust cycles of an internal combustion engine ("ICE") such as the well-known two or four cycle, spark ignition engines. The system includes intake and exhaust port valves for admitting the air/fuel mixture into the cylinder and exhausting the burned gases of combustion from the cylinder. Timing or synchronizing the opening and closing of these valves is one of the three kinds of timing functions that must be satisfied in an internal combustion engine: timing the valves, the injection of fuel, and the spark or other energetic impulse that provides ignition of the air fuel mixture.

In principle, the valves are configured as ports or apertures formed in a rotating member disposed adjacent fixed intake and exhaust ports into or out of the engine cylinder. The concept is illustrated in the attached concept figures for a single cylinder, four cycle engine, but is adaptable to two cycle engines and other operating cycles. The drawings include views of several alternative embodiments, depending on the location of the fixed ports into the cylinder and the configuration of the rotating ports for their cyclical, synchronized alignment with the fixed ports. The illustrated specimens depict variations of the rotating valve port ("RVP") concept embodied in the disclosed invention. In some examples the RVP periodically aligns with a fixed valve port formed in the side wall of the engine cylinder. In other examples, the RVP periodically aligns with a fixed valve port formed in the top side or ceiling of the engine cylinder, typically called the cylinder head. In both examples, the valve ports open into a combustion chamber disposed in the upper portion of the engine cylinder. Each engine cylinder includes an intake valve port and an exhaust valve port that communicates with the combustion chamber of the engine cylinder. Inlet or outlet passages coupled with the intake or exhaust ports respectively may be parts of a manifold as in a typical internal combustion engine.

In the following descriptions of the drawings, several terms need defining. The engine cylinder in the embodiments illustrated herein, through which the piston reciprocates, includes a combustion chamber at the end opposite the crankcase. The combustion chamber may reside within the upper portion of the cylinder and include a portion of its volume in a cylinder head that forms the top side of the cylinder. The engine cylinder may be defined by a cylinder wall having an inside surface and an outside surface, referred to herein as a side wall. The rotating valve port structure may be a disc or ring gear or a ring gear having a cylindrical ring or a cylindrical extension of one side of the ring gear. In some embodiments, the cylindrical ring may have a relatively short axial length; in other embodiments, the cylindrical ring may be elongated to have a more substantial length so that it resembles a tubular component.

The rotating valve port structure (aka rotating port member) may also be understood as a driven gear that meshes with a drive gear attached to the crankshaft and shares its axis with the crankshaft. Further, the rotating valve port may be supported by a bearing disposed on an axle such as a shoulder bolt secured to the engine block. Details of the bearing and axle are omitted from the drawings to provide clarity of the essential features of the rotating valve port concept. Bearings and axles are mechanical elements that are well-understood by persons skilled in the art. In one example, a bushing or bearing disposed on a shoulder bolt as an axle may be used to support the rotating valve port. Alternatively, a semi-circular cradle (see, e.g., page 11) may support the rotating valve port in a cradle like structure. Bearing surfaces may include babbitt-type bearing inserts, ball bearings, bushings, or simply bearing surfaces that are hardened or coated with wear: resistant ceramic compounds. Other surfaces in contact with moving parts may also be hardened or coated with wear-resistant ceramic compounds.

Figure 12:
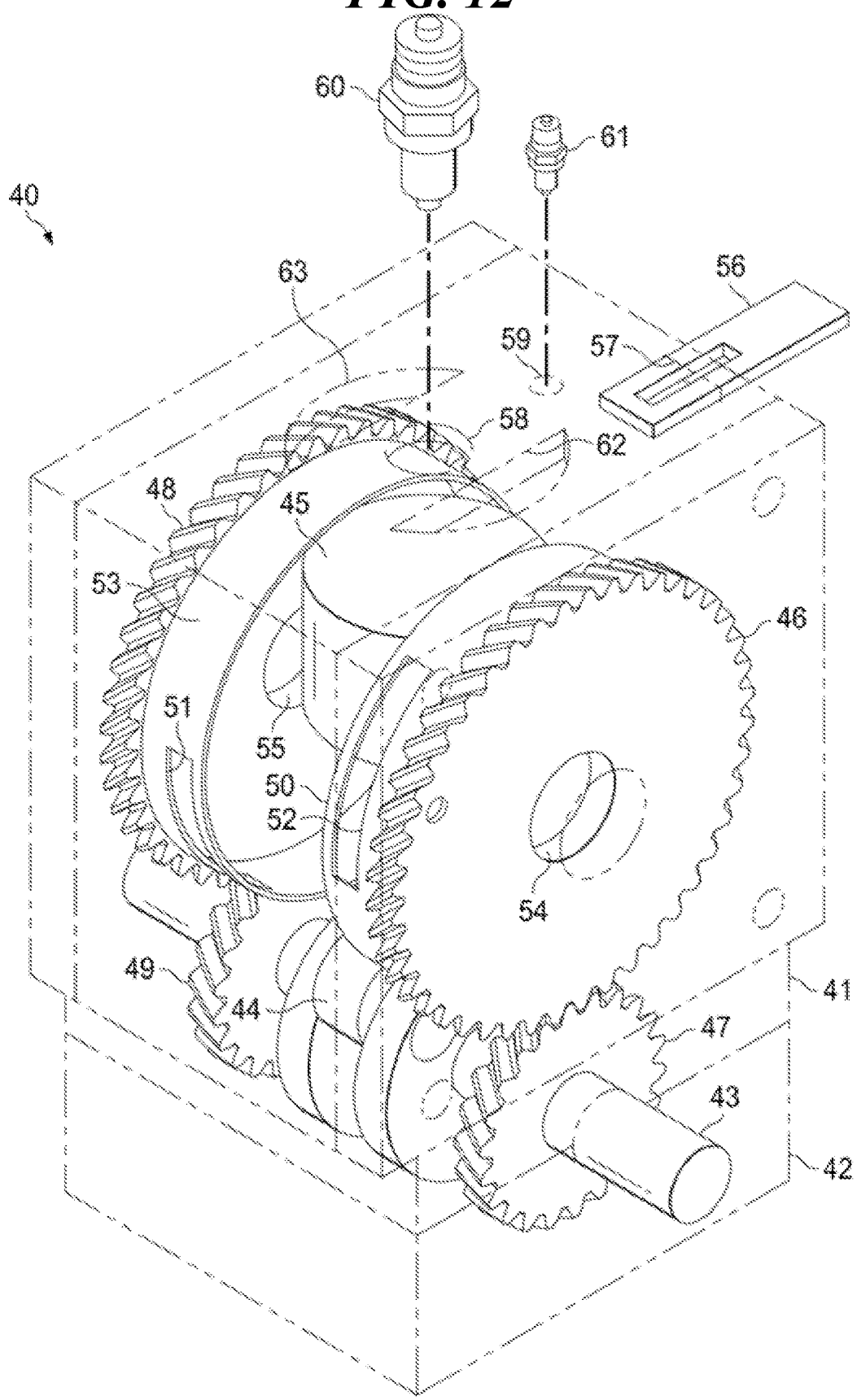
FIG. 12 illustrates an isometric view of a second embodiment of the present invention.
Figure 13:
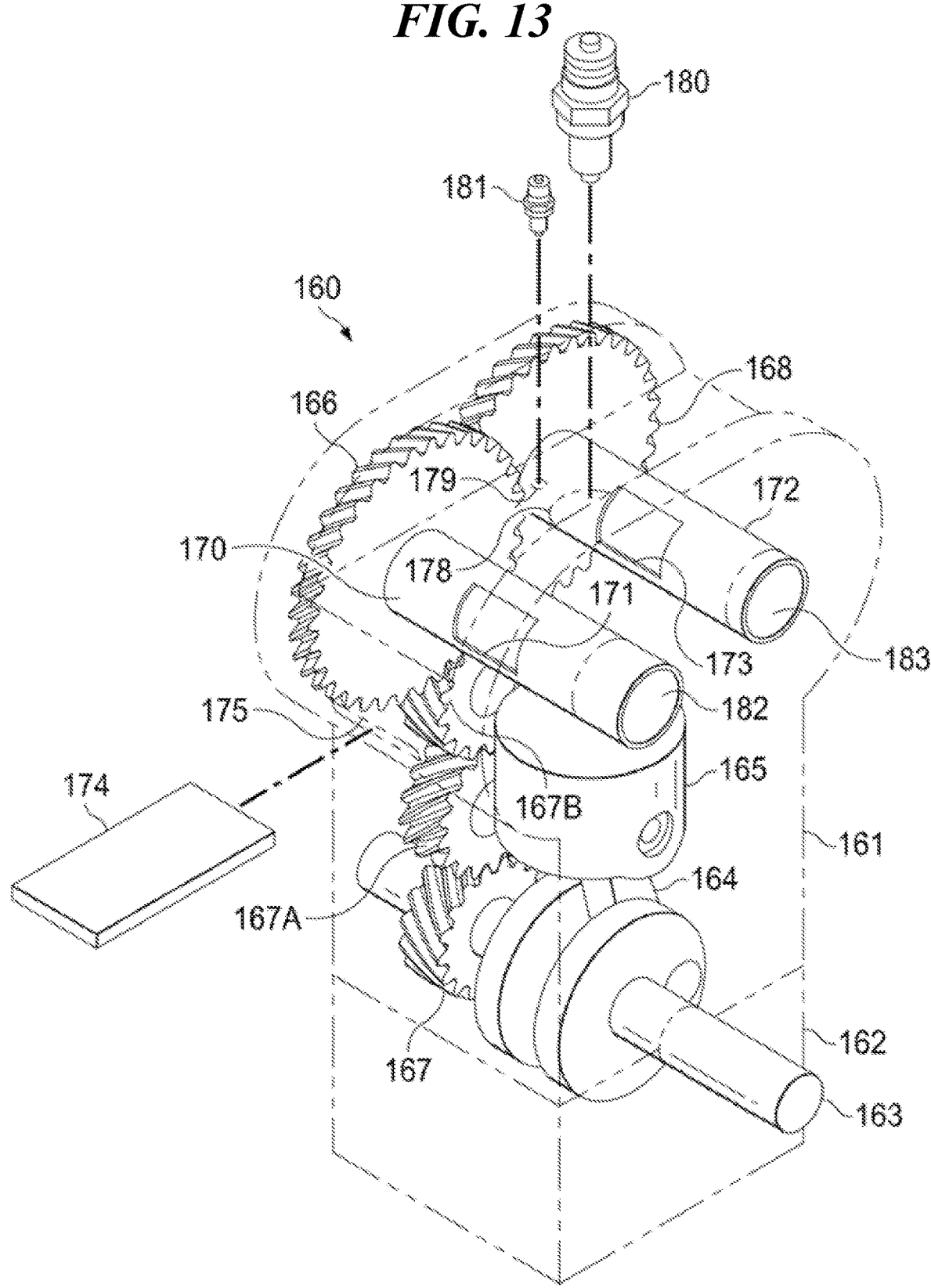
FIG. 13 illustrates an isometric view of a third embodiment of the present invention.
Figure 14:
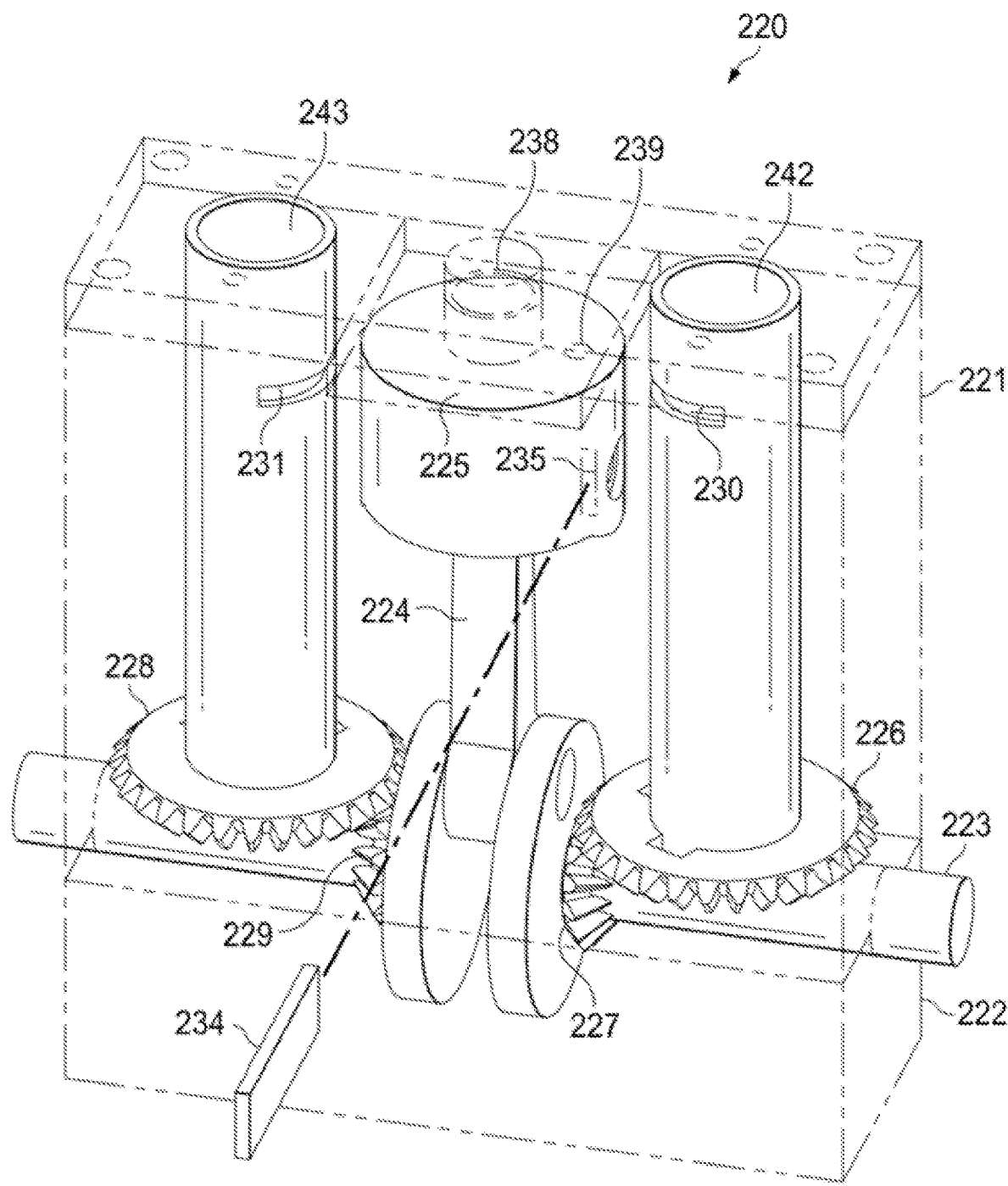
FIG. 14 illustrates an isometric view of a fourth embodiment of the present invention.
Figure 15:
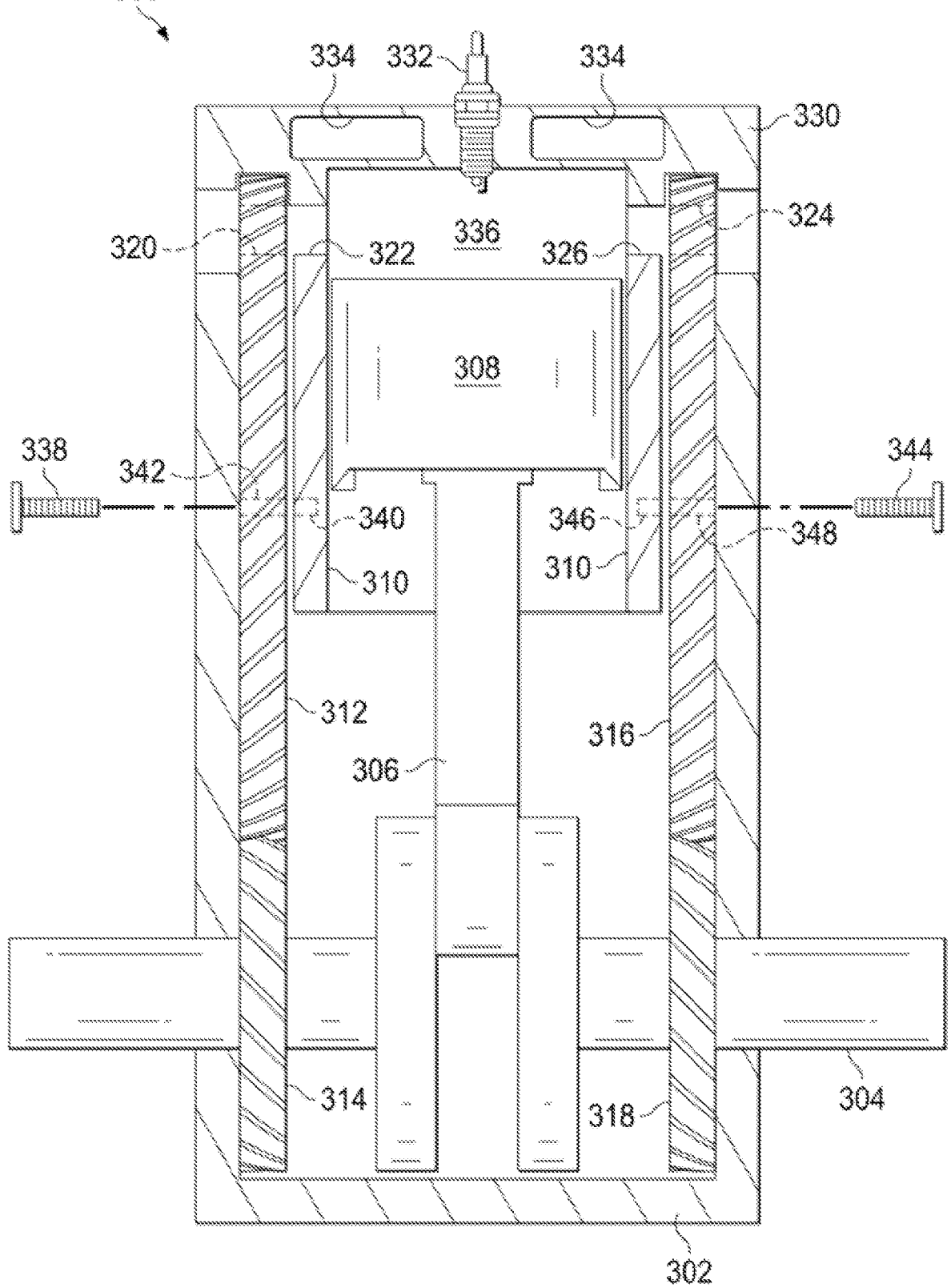
FIG. 15 illustrates a schematic cross section of a conceptual embodiment of the present invention.
Figure 16:
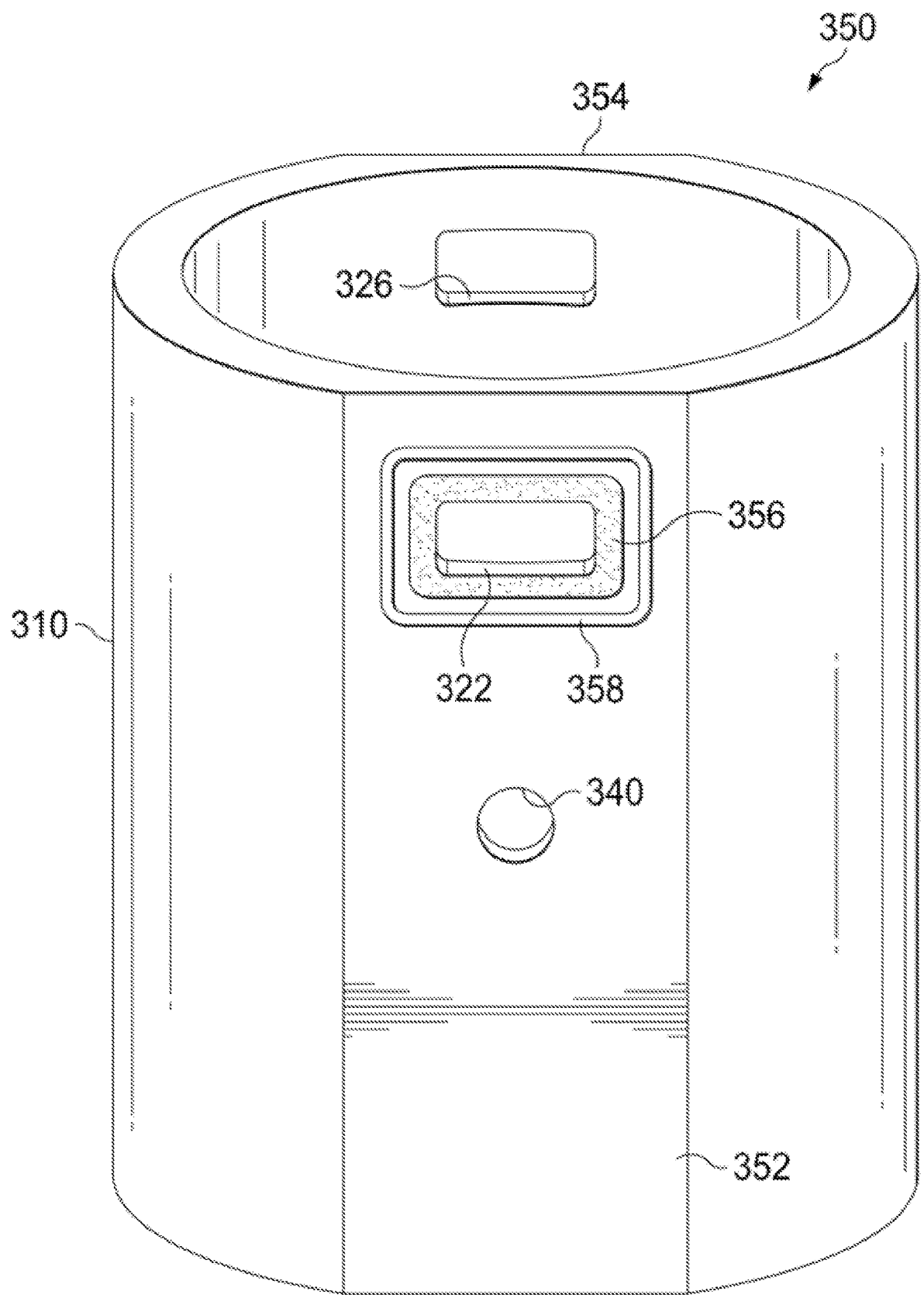
FIG. 16 illustrates a side view of an engine cylinder as formed in the embodiment of FIG. 11.
Figure 23:
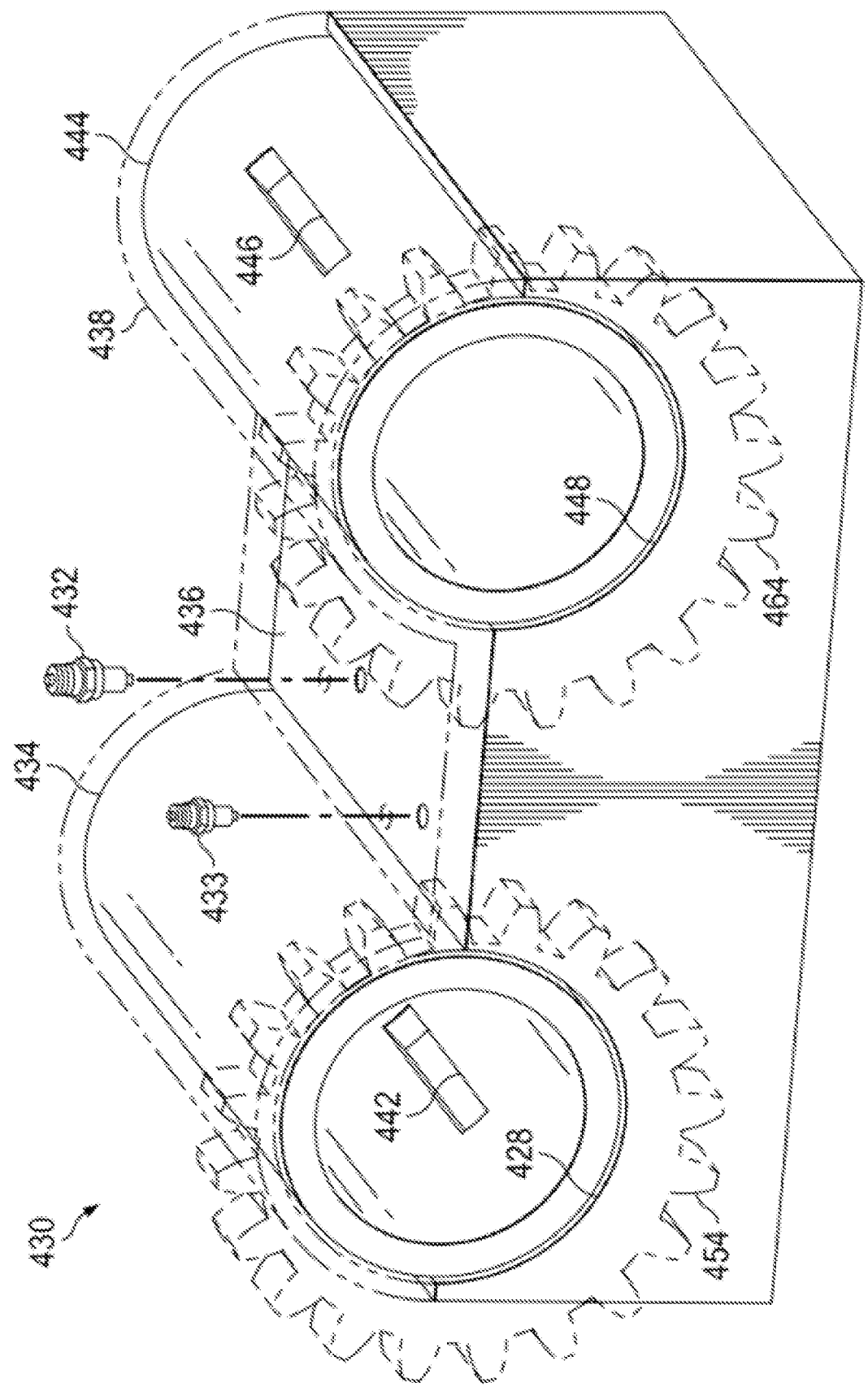
FIG. 23 illustrates an isometric view of a cylinder bead portion of the embodiment of FIG. 13.
Figure 24:
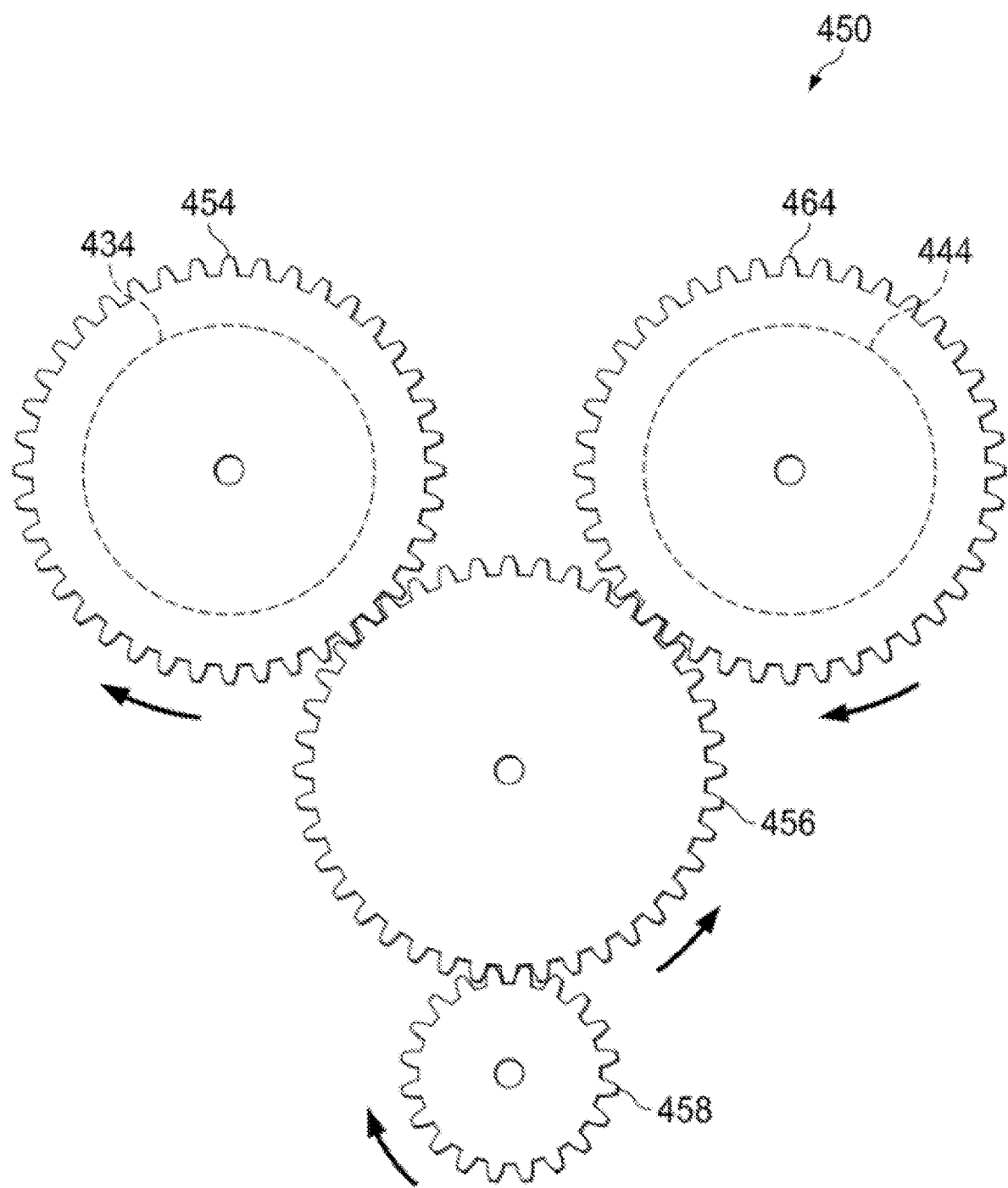
FIG. 24 illustrates a timing gear set for use with the embodiment of FIG. 23.
Figure 25:
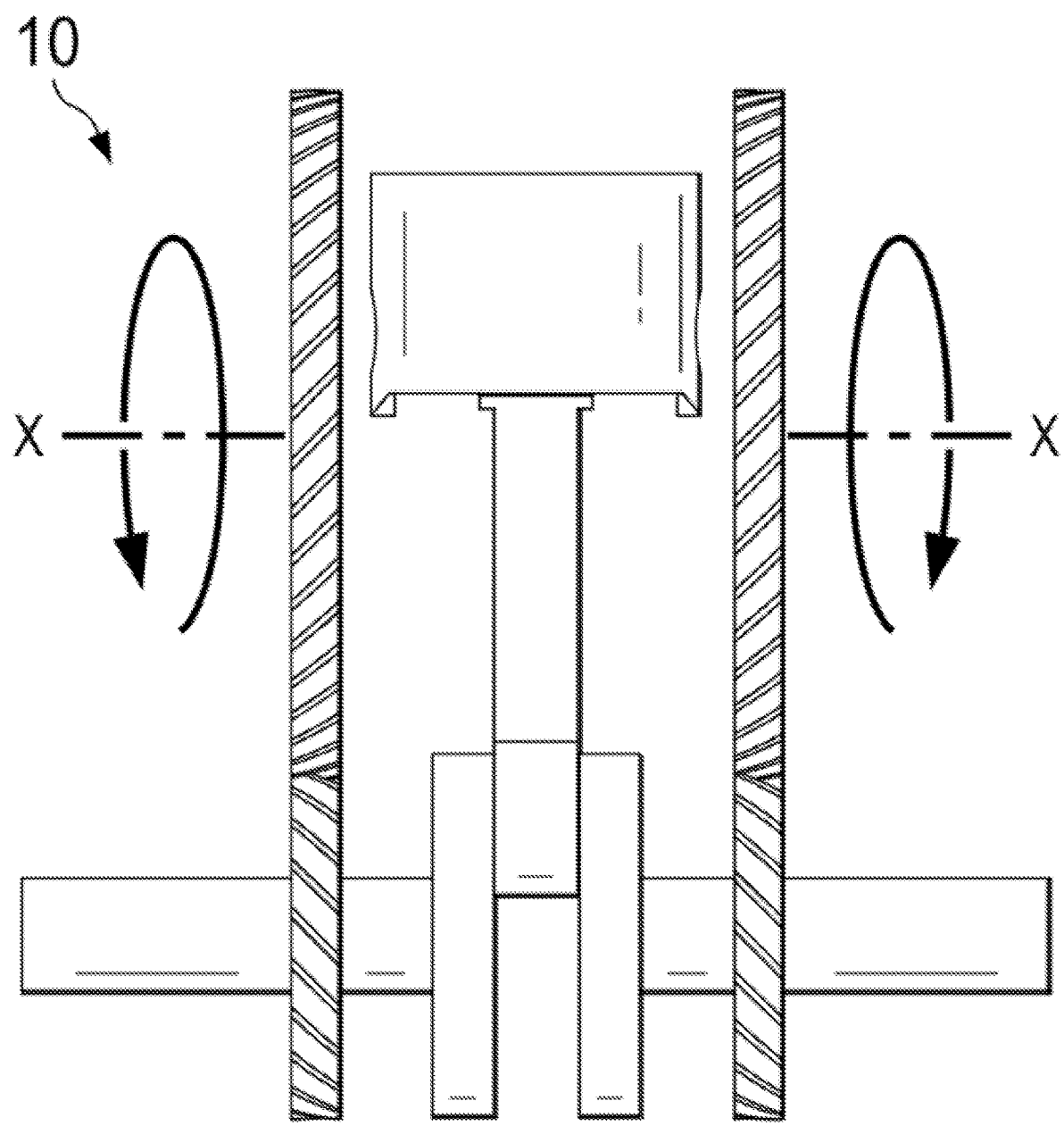
FIG. 25, FIG. 26, FIG. 27, FIG. 28, FIG. 29, FIG. 30, FIG. 31, FIG. 32, FIG. 33, and FIG. 34, illustrate a family of symbolic cross section drawings that correspond to the members of the family of embodiments depicted in FIG. 1, FIG. 2, FIG. 3, FIG. 4, FIG. 5, FIG. 6, FIG. 7, FIG. 8, FIG. 9, FIG. 10.
Figure 26:
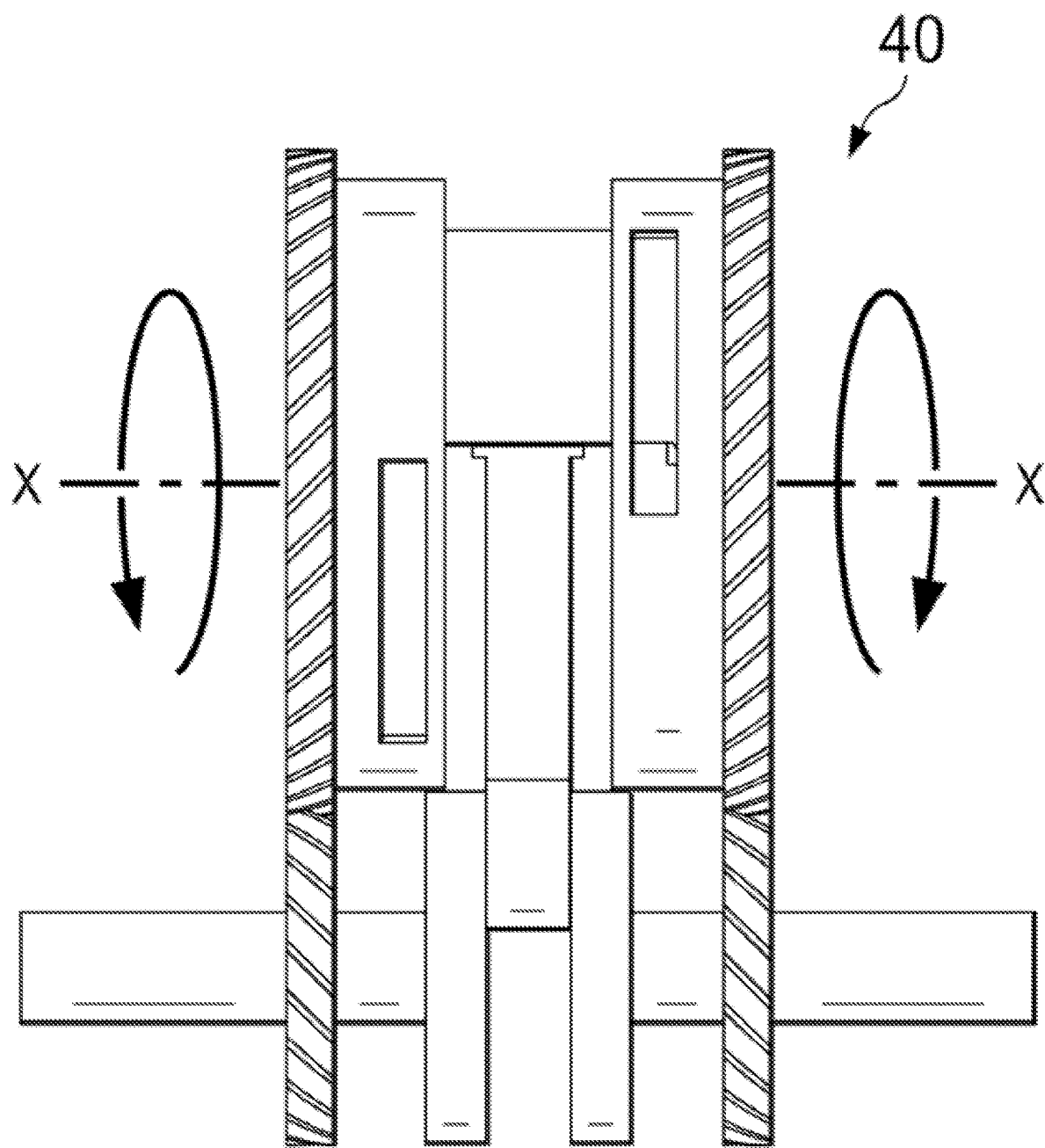
Figure 27:
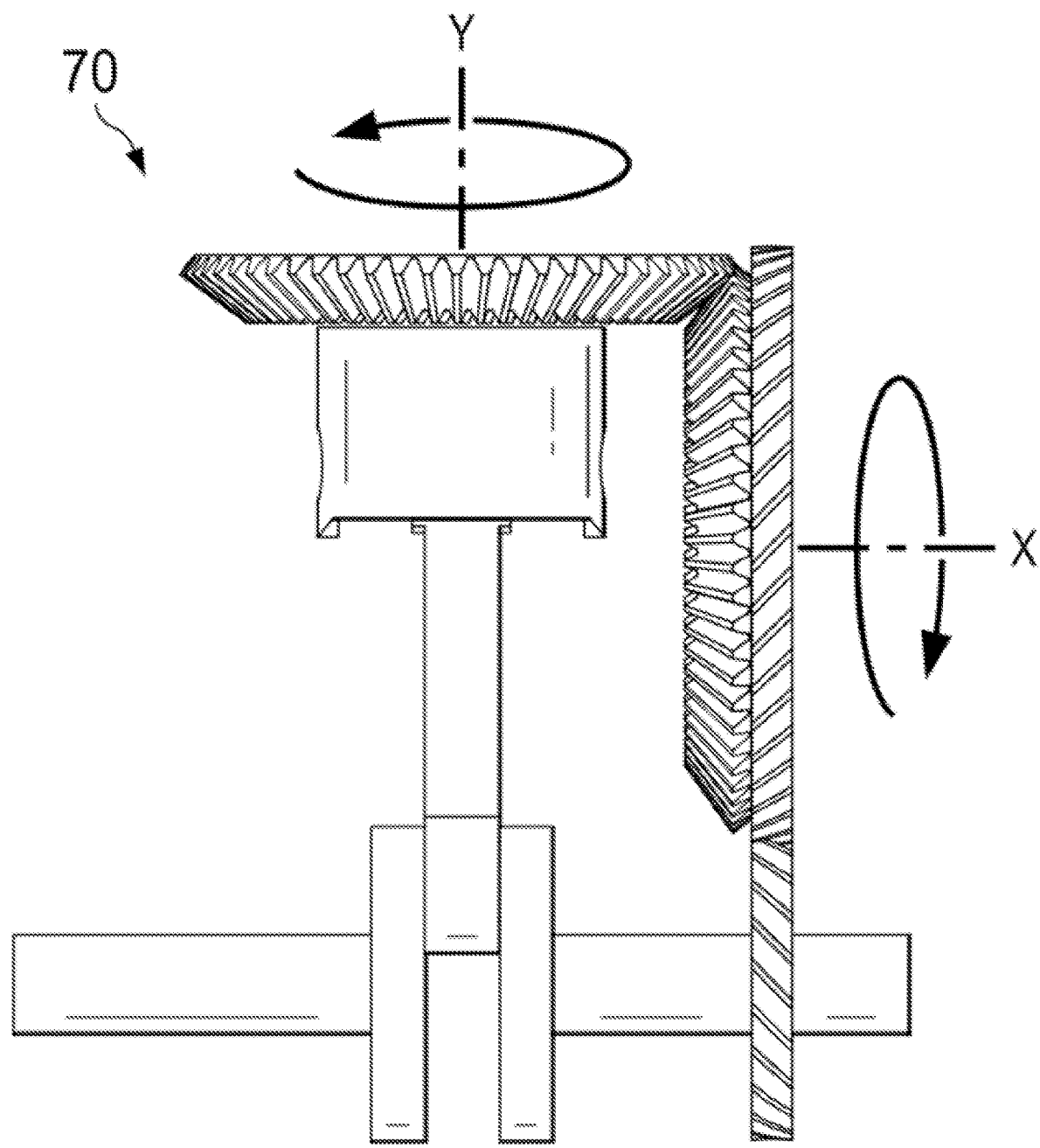
Figure 28:
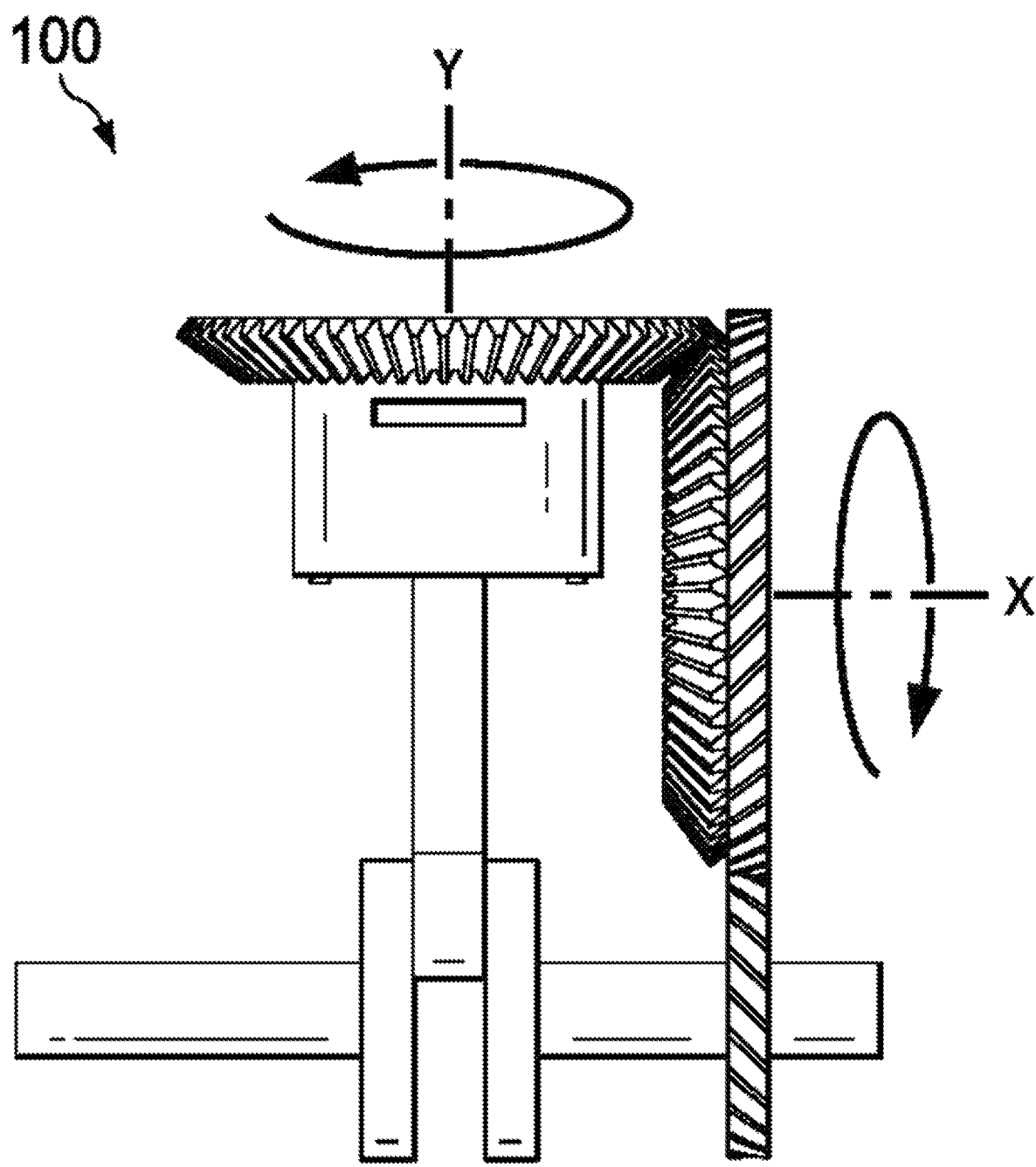
Figure 29:
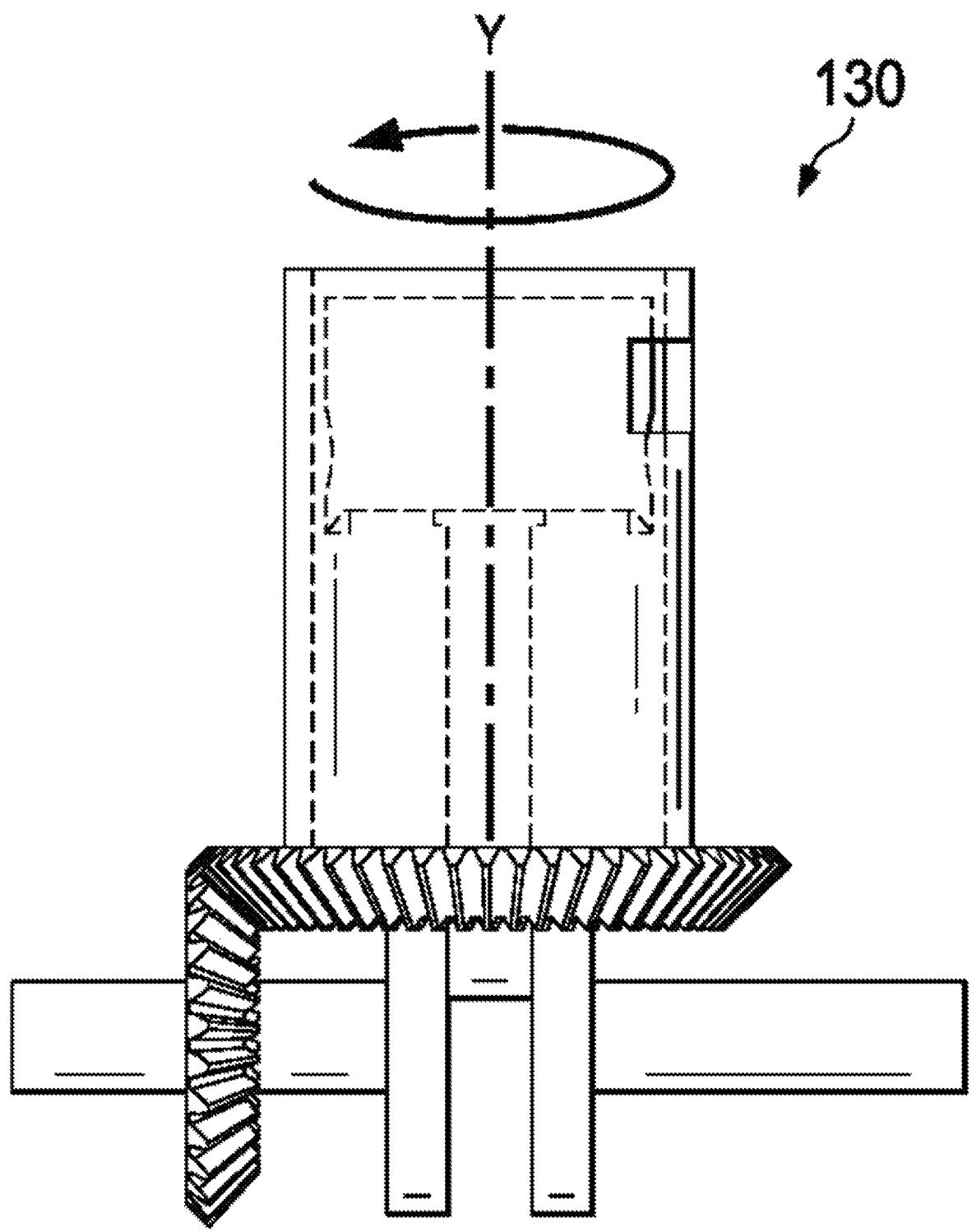
Figure 30:
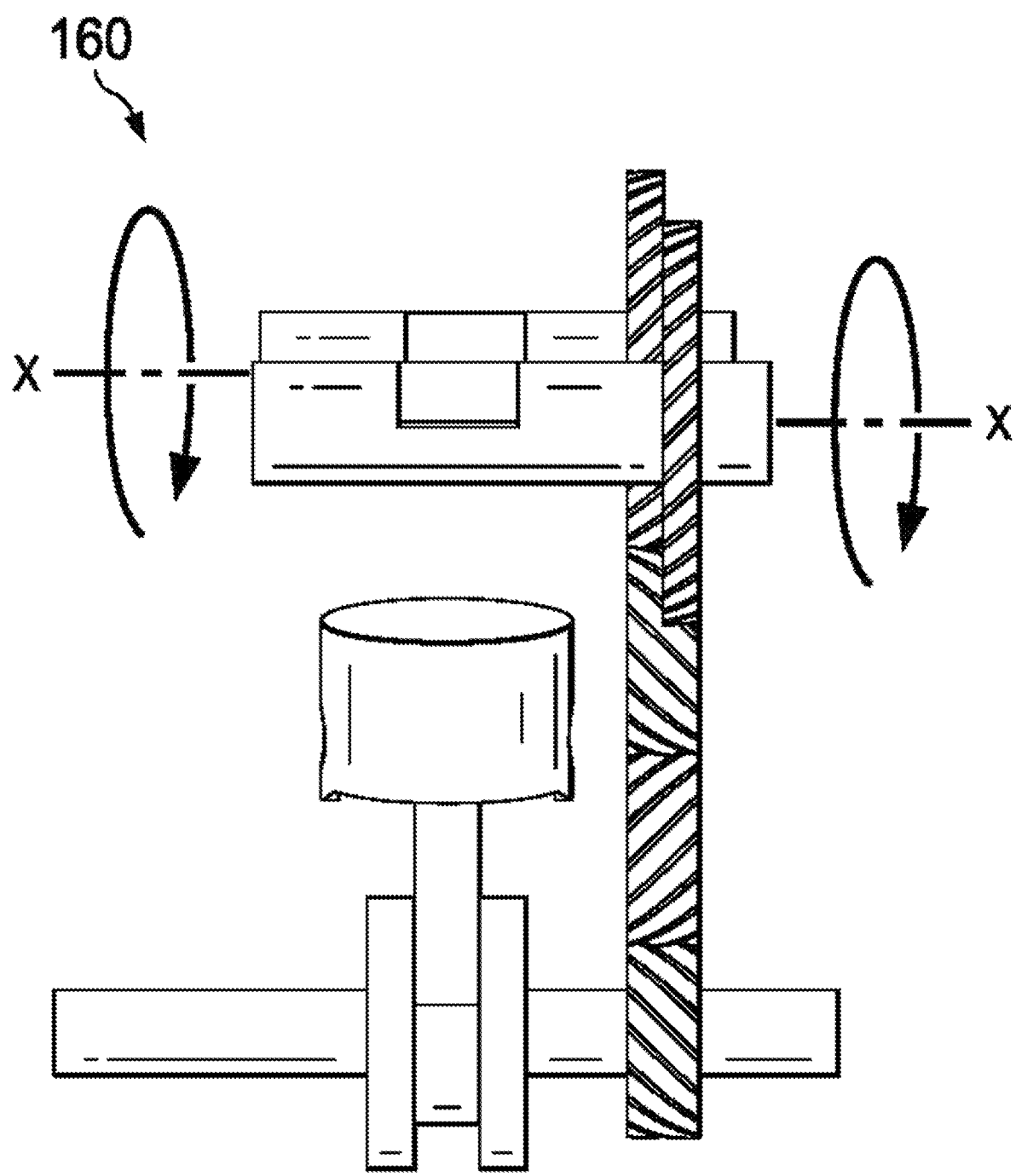
Figure 31:
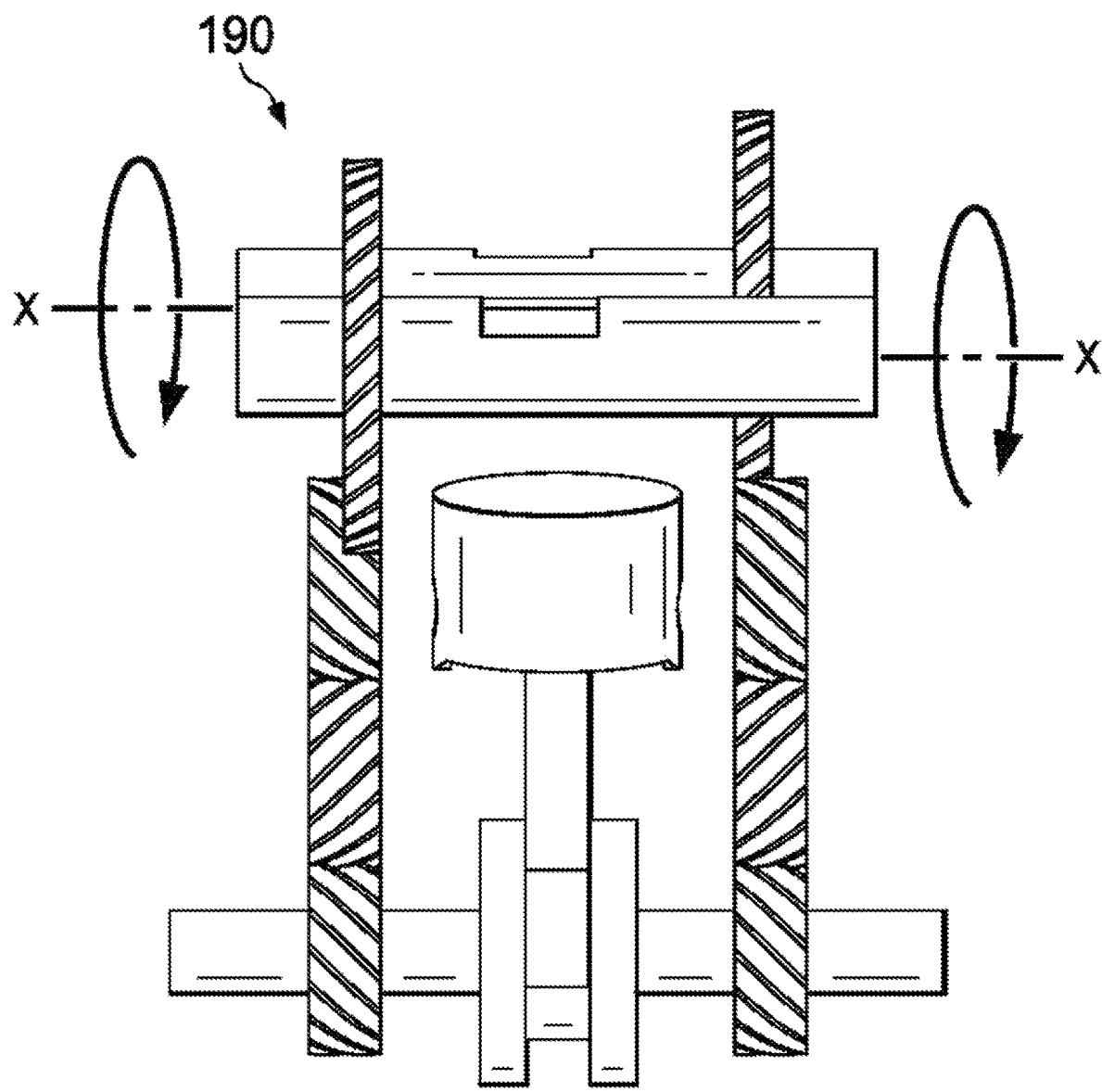
Figure 32:
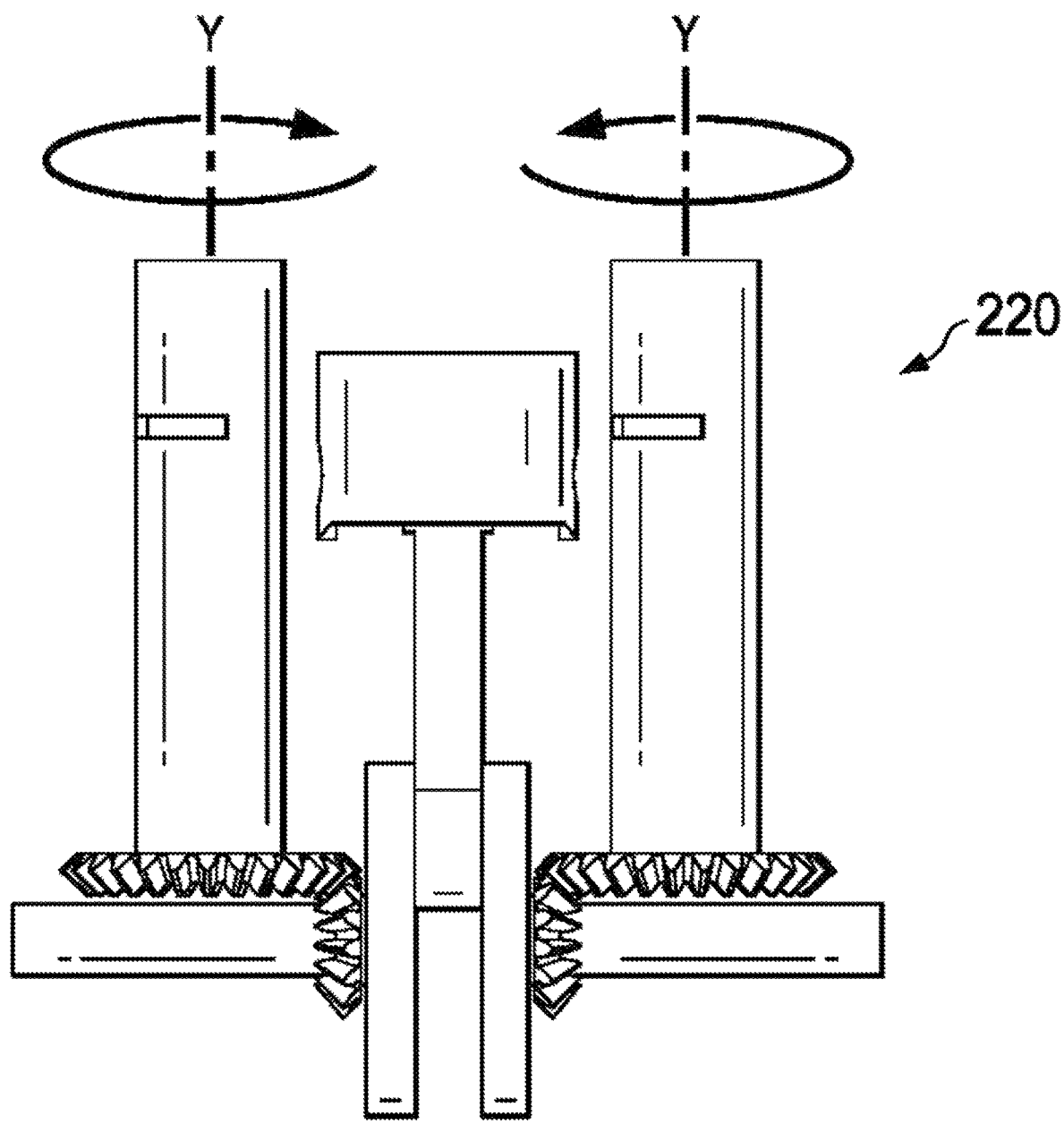
Figure 33:
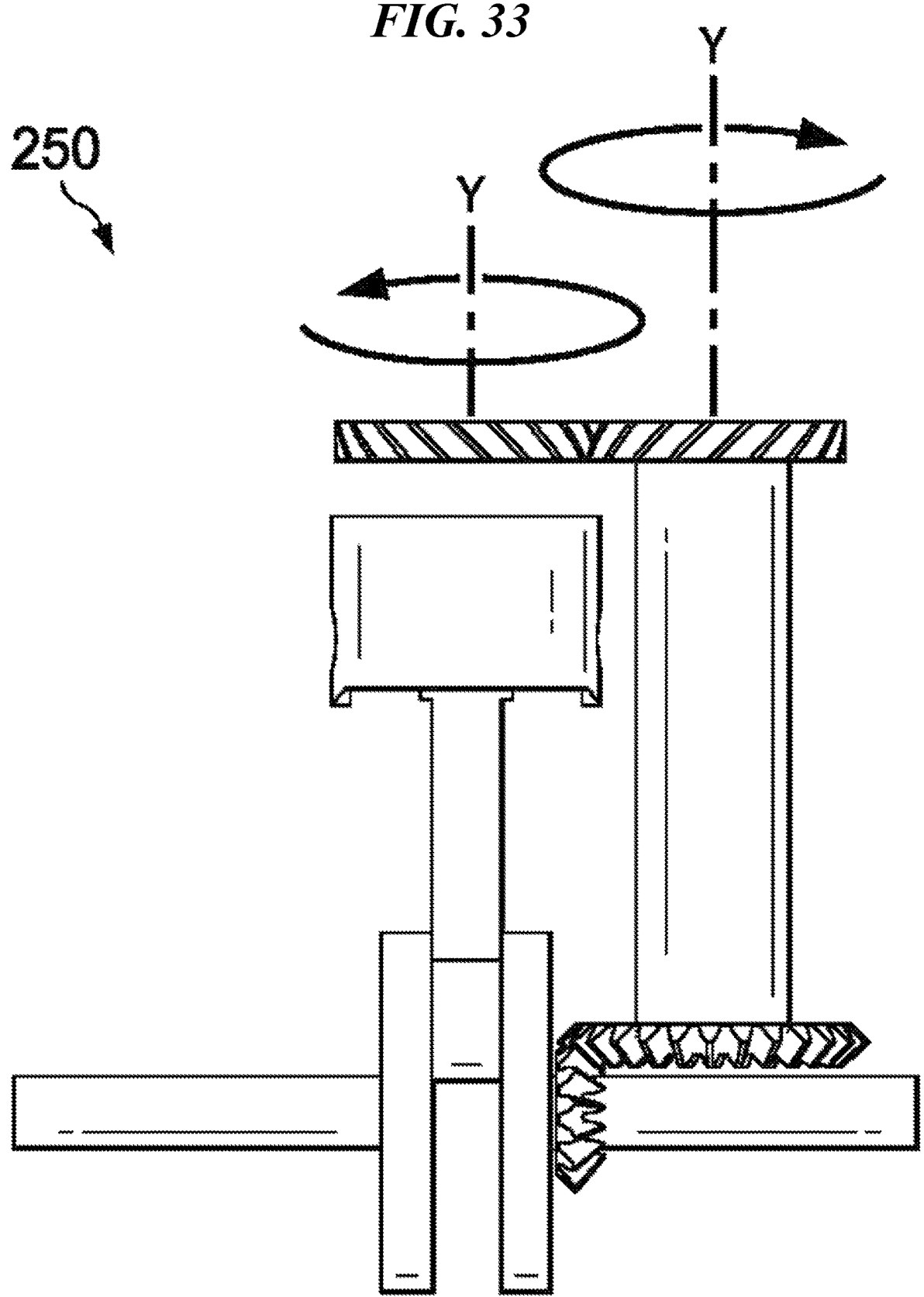
Figure 34:
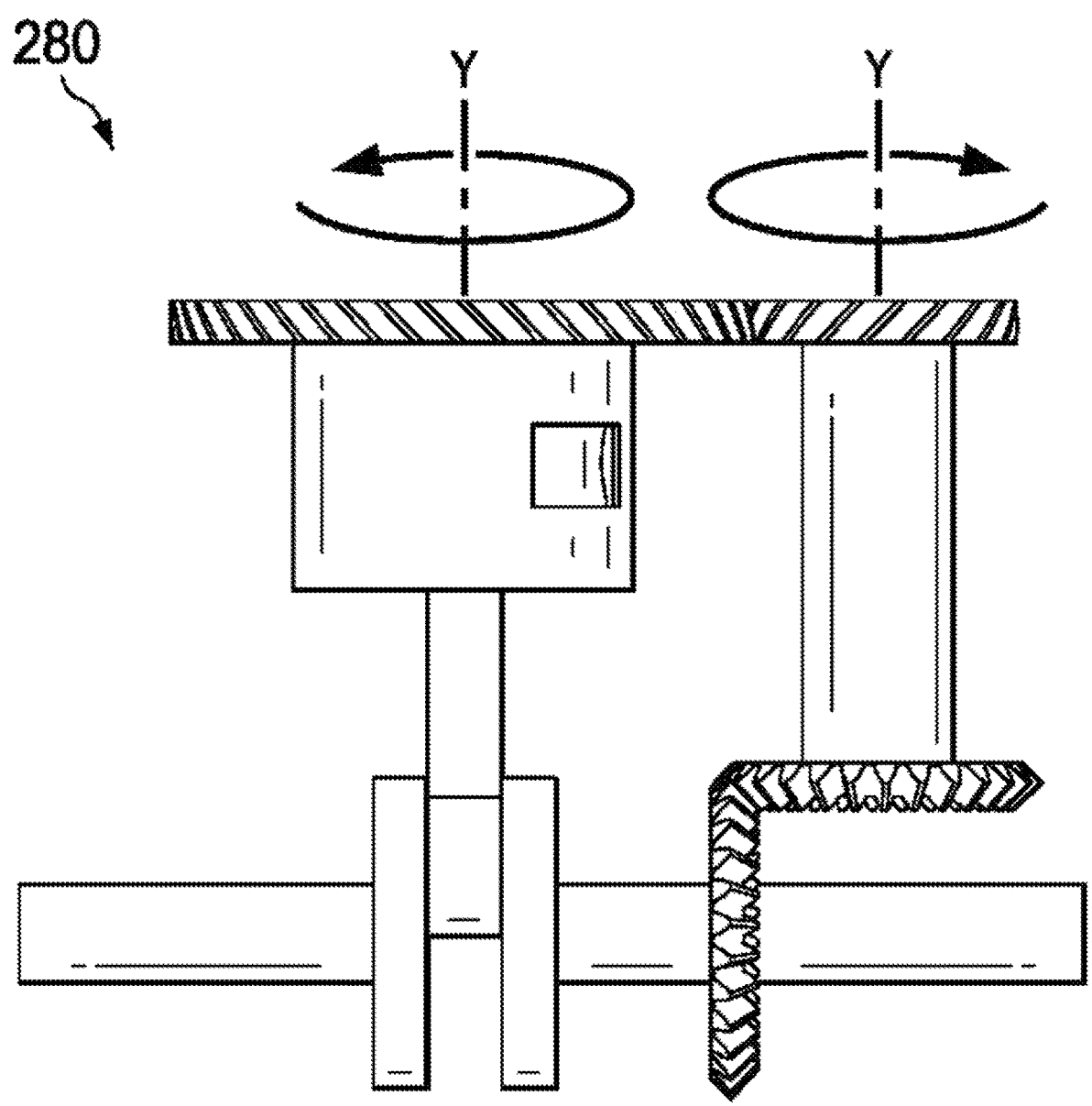
Figure 37:
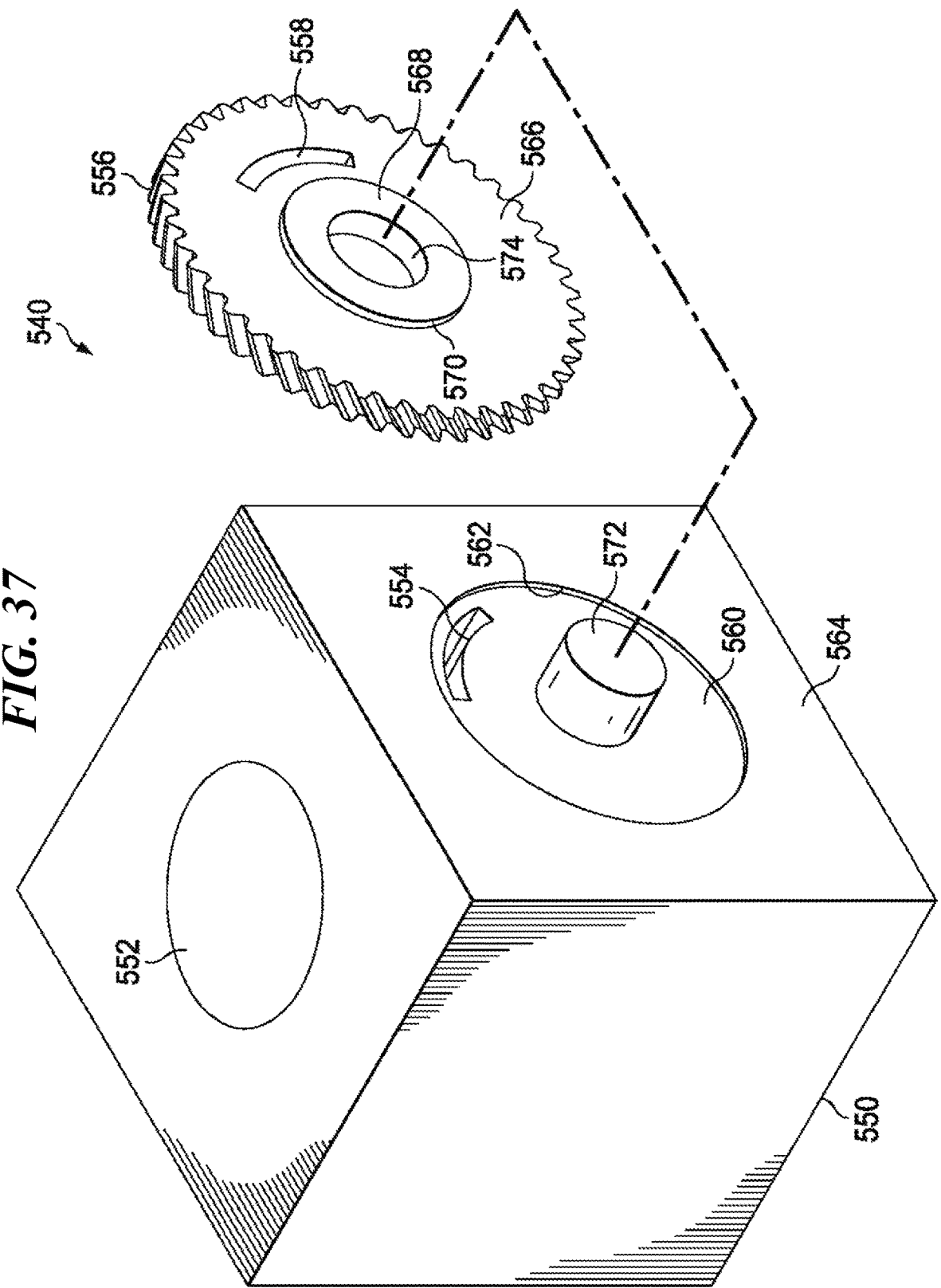
FIG. 37 illustrates an alternate structure for sealing the intake and exhaust ports according to the present invention.

The drawings are organized as follows. FIG. 1 depicts isometric views of each of ten exemplary embodiments of the rotating valve port concept, FIG. 11, FIG. 12, FIG. 13, and FIG. 14 depict enlarged examples of four of the embodiments shown in FIG. 1 to illustrate the relationships of essential parts of the engines. The four embodiments of FIG. 11, FIG. 12, FIG. 13, and FIG. 14 illustrate two basic configurations of the invention: (A) placing the rotating valve port along the outer side of the engine cylinder (FIG. 11 and FIG. 14), and (B) placing the rotating valve port over the top side of the engine cylinder to connect the inlet or exhaust passages through the cylinder head (FIG. 12 and FIG. 13). FIG. 15 is a schematic cross section view of a type A configuration to describe the structure and operation of the side-disposed rotating valve port embodiments. FIG. 16 illustrates one embodiment of a sealing structure around a valve port in a type A configuration. FIG. 17, FIG. 18, FIG. 19, FIG. 20, FIG. 21, and FIG. 22 depict several states of a secondary Multi-Stage valve for use with embodiments of the rotating valve concept to vary the cross section area of a port. FIG. 23 and FIG. 24 are schematic depictions of a type B configuration—the top-side-disposed rotating valve port embodiments. FIG. 13 illustrates symbolic representations of the ten embodiments shown in FIG. 1. FIG. 14 provides a flow chart of a method of timing the operation of the intake and exhaust valves. FIG. 37 depicts one embodiment of a sealing structure that confines leakage gases to the immediate region around the joint in the port passages between the rotating and fixed portions of the port structure. Further, in regard to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, the engine cylinder, combustion chamber, and manifolds are omitted from the isometric views to more clearly show the relationship of the rotating valve ports with the piston, as will become clear in the following to description. The view in FIG. 15 includes the engine cylinder head and the combustion chamber.

FIG. 1, FIG. 2, FIG. 3, FIG. 4, FIG. 5, FIG. 6, FIG. 7, FIG. 8, FIG. 9, FIG. 10 illustrate isometric views depicting several members of the family of embodiments of the present invention. The illustrations include a crankshaft and piston assembly, the rotating gear elements, and an outside of an engine block, but omit the engine cylinder, cylinder head and manifolds to more clearly depict the essential components of the structure. Ten configurations are shown, representing two orientations of a rotating valve port disposed next to the outer side of an engine cylinder (type A) or next to the top or cylinder head of the engine cylinder (type B). The concepts of the invention are illustrated for a single cylinder, four cycle engine but are adaptable to multiple cylinder engines farmed for four or two cycle operation, and to engines designed to operate on gasoline, diesel and other types of fuels. Each of the embodiments is labeled with an identifier of the form RVP-1, RVP-2, . . . , RVP-10, where RVP denotes a "rotating valve port" configuration. Examples RVP-1, 4, 5, 8 and 10 depict type A embodiments of the port configuration and RVP-2, 3, 6, 7 and 9 depict type B embodiments of the port configuration.

The rotating valve port is formed in a rotating gear or a cylindrical extension of one side of the rotating gear. The rotating gear (aka a rotating port or driven gear) is driven by a drive gear disposed on a rotating crankshaft. In some implementations an idler gear may be disposed between the drive gear and the rotating valve port gear. In embodiments having the rotating port formed in a cylindrical extension of one side of the rotating gear, the cylindrical extension is configured as a cylindrically-formed ring having first and second parallel edges that define the ends of the cylindrical extension. In some embodiments the cylindrical extension appears as a "short" cylinder; in other embodiments, the cylindrical extension appears as a longer cylinder. In either case, the cylindrical extension may be coaxially attached at the first edge thereof to a side of the rotating disc facing the engine cylinder, such that the second port is formed in the ring between the first and second parallel edges as shown in FIG. 1 for the RVP-2 and RVP-6 and RVP-7 configurations.

In general, the rotating ports, and the fixed ports formed in the outer wall of the engine cylinder, may be formed as an aperture elongated in the radial direction of rotation of the rotating port valve. A fixed port in the outer side wall of the engine cylinder may be oriented along a perimeter of the engine cylinder surface, and termed as a simple rectangular shape varied from square to elongated, or it may be fanned to be round or oval. Other shapes and orientation are possible and not limited to these alternatives. A rotating port may likewise vary in shape and orientation in the rotating valve disc. As the rotating valve passes the fixed port in the wall of the engine cylinder, the valve opens as the rotating valve port passes over the fixed port, first increasing in open area cross section, reaching a maximum aperture, then decreasing in open area cross section. The shape of the valve ports may be varied to adjust the particular valve opening profile to suit the characteristics of the engine design. For example, the shape may be tailored to vary the speeds of the increase and decrease in the port apertures.

Figure 2:
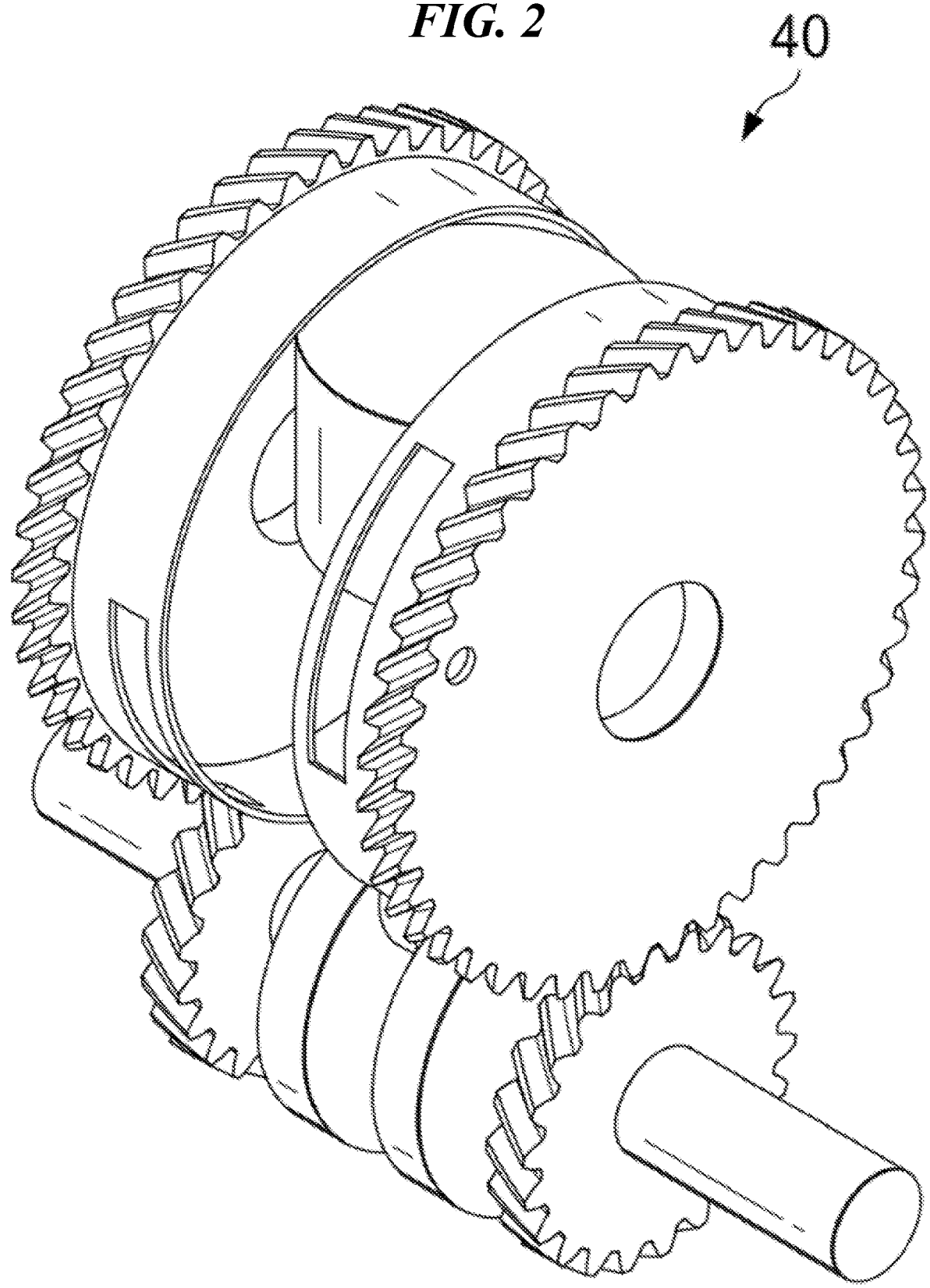

RVP-1 (reference number 10) in FIG. 1 shows a first and a second rotating gear, each disposed on opposite sides of a piston. Each rotating gear includes a port formed through the body of the gear near the perimeter of the gear. As the gear rotates, the port in that gear becomes periodically aligned with a fixed port in an upper side wall of the engine cylinder. This embodiment may be considered the original and most basic implementation, RVP-2 (40) in FIG. 2 is similar but is different in one key aspect: the rotating ports are formed in a short, cylindrical extension of the side of each rotating gear facing the piston. The cylindrical extension may be formed as a thin ring in which the axial length of the ring body's cross section is substantially greater than the radial thickness of the ring body's cross section. As the RVP gear rotates, the cylindrical extension or ring revolves in a relief formed in the engine block and cylinder head (the relief is not shown in FIG. 2) such that the rotating port becomes periodically aligned over a fixed port in the cylinder head that forms the top end of the engine cylinder. During the period that the port apertures are aligned, incoming air (or air/fuel mixture) is inlet from an intake manifold passage (not shown), or outgoing exhaust gas is outlet into an exhaust manifold passage (not shown).

Figure 3:
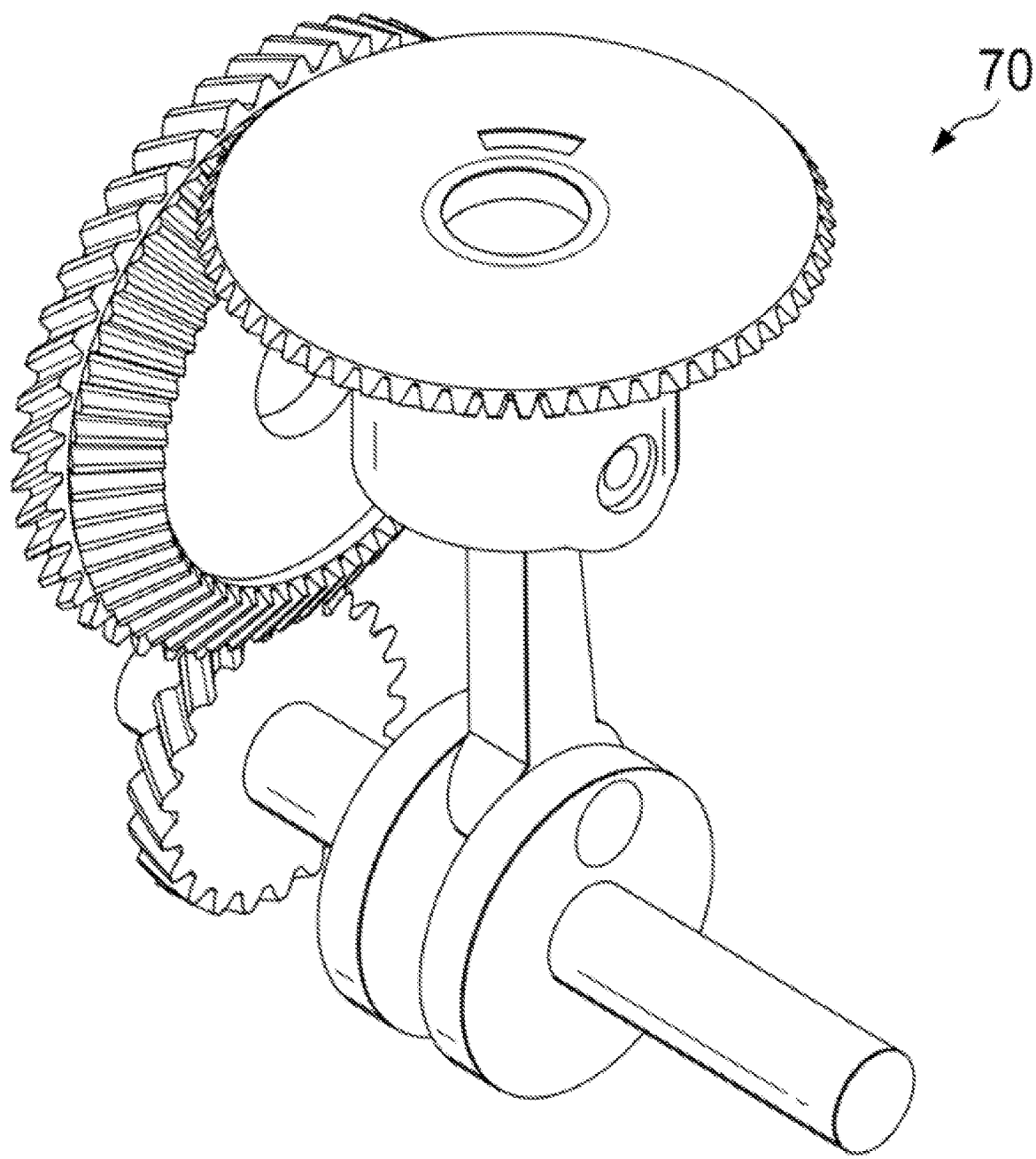
Figure 9:
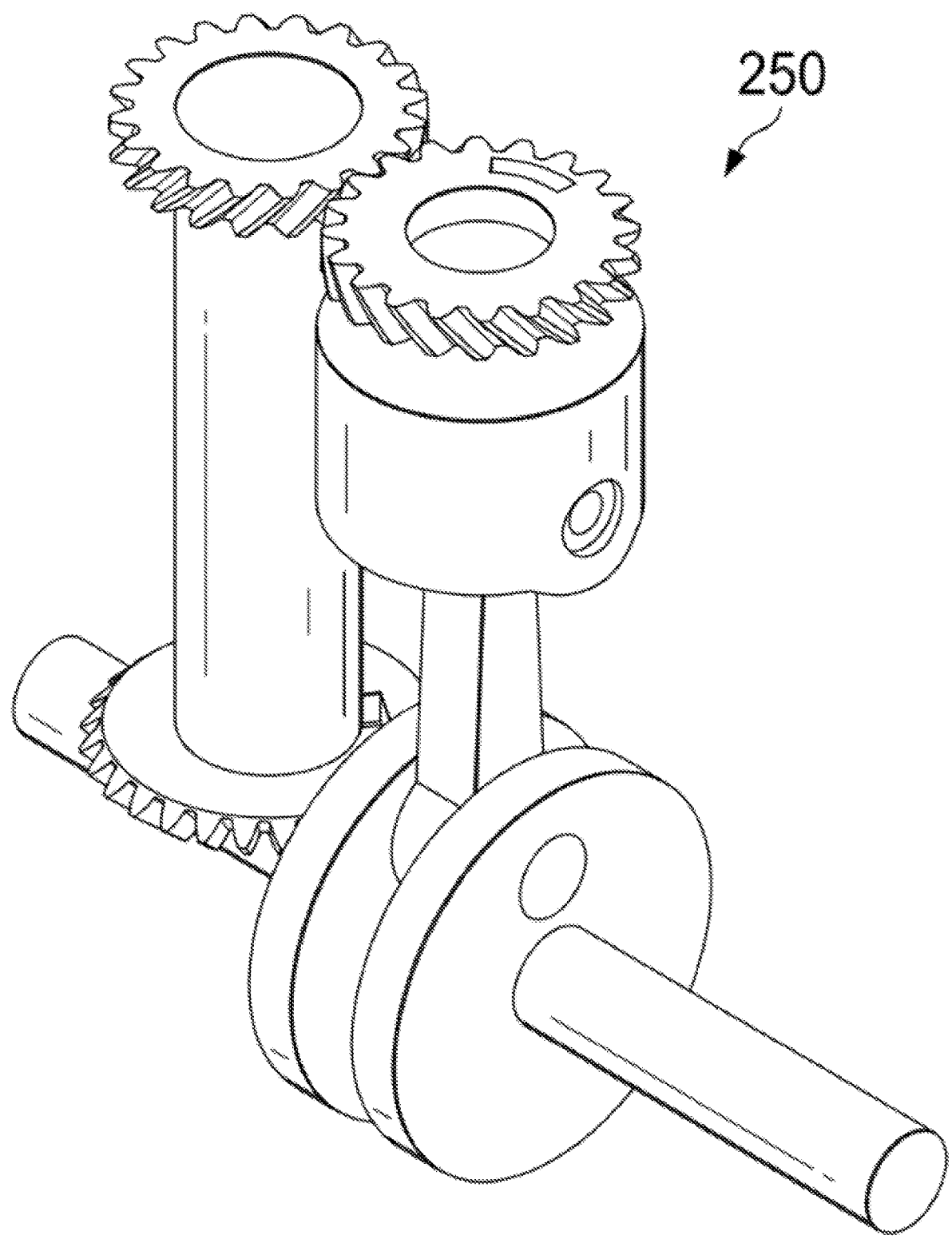

RVP-3 (70) in FIG. 3 and RVP-9 (250) in FIG. 9 are variations or alternate embodiments of the top-side placement of the rotating port, in which the port is formed in a gear that rotates in a plane parallel with the top side of the cylinder and over and above the fixed ports in the cylinder head or top side of the cylinder.

Figure 6:
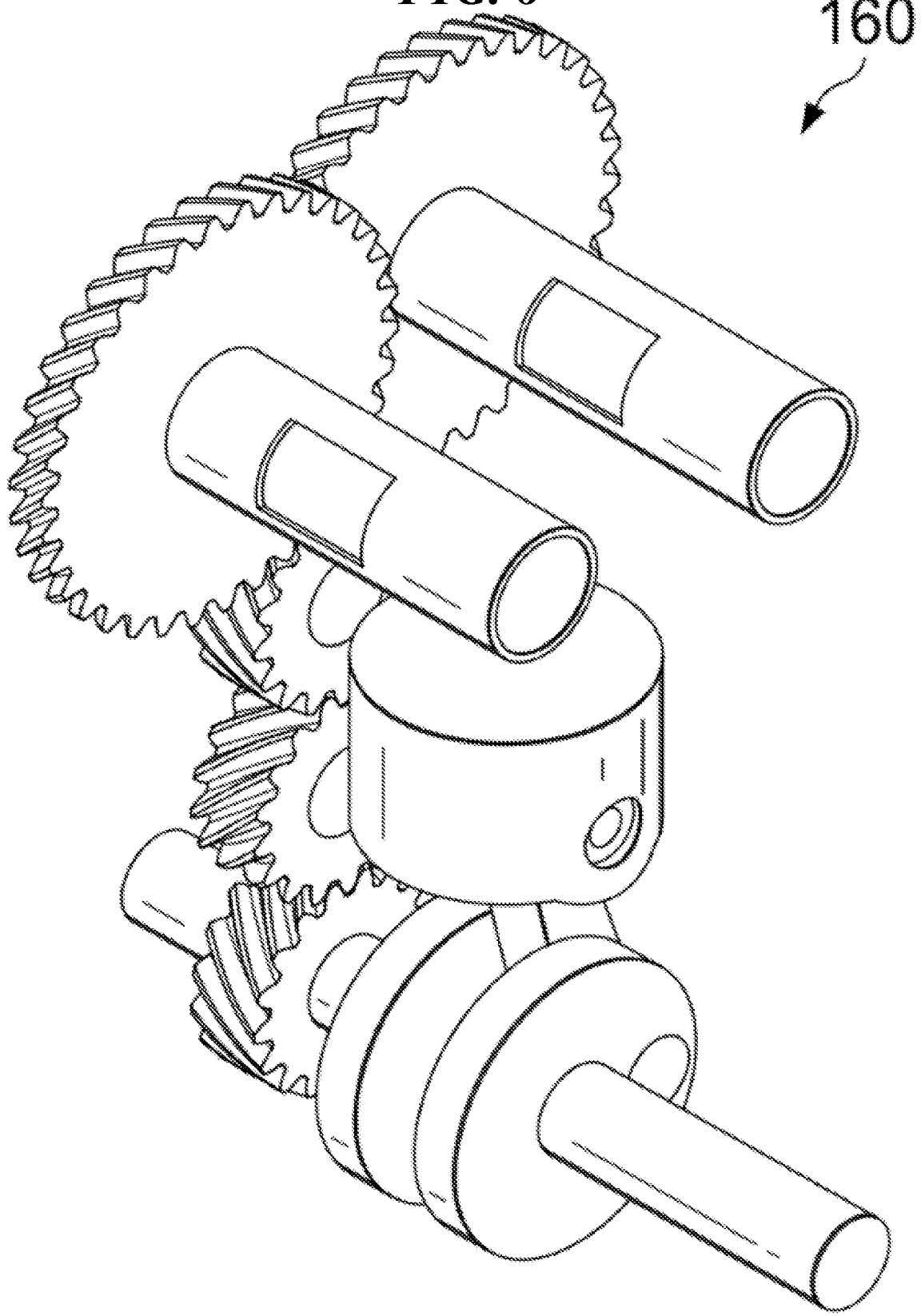
Figure 7:
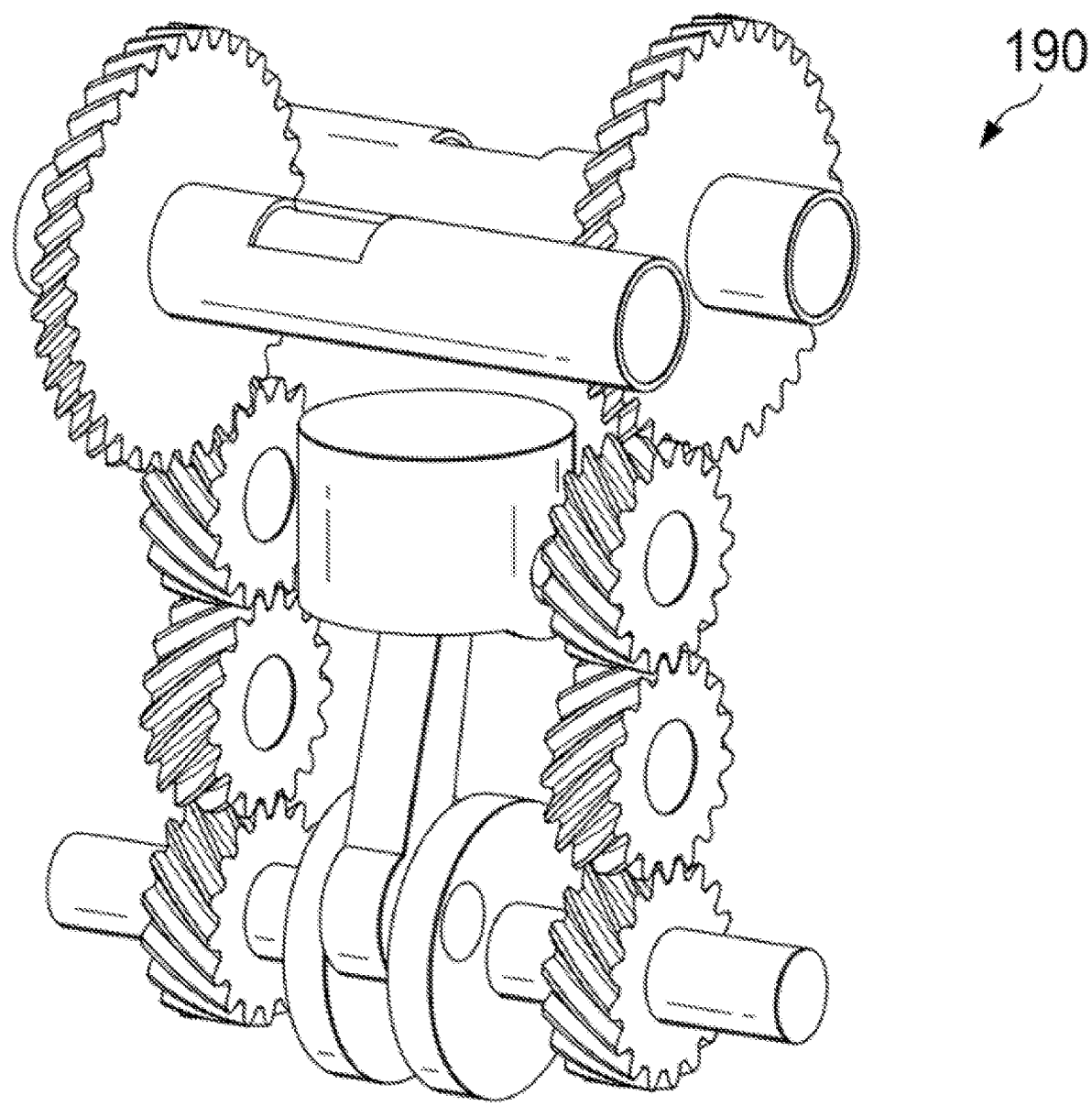

RVP-6 (160) in FIG. 6 and RVP-7 (190) in FIG. 7 are variations or alternate embodiments of the top-side placement of the rotating port, in which the port is formed in a cylindrical extension of the rotating gear and positioned over and above the fixed ports in the cylinder head or top side of the cylinder.

Figure 4:
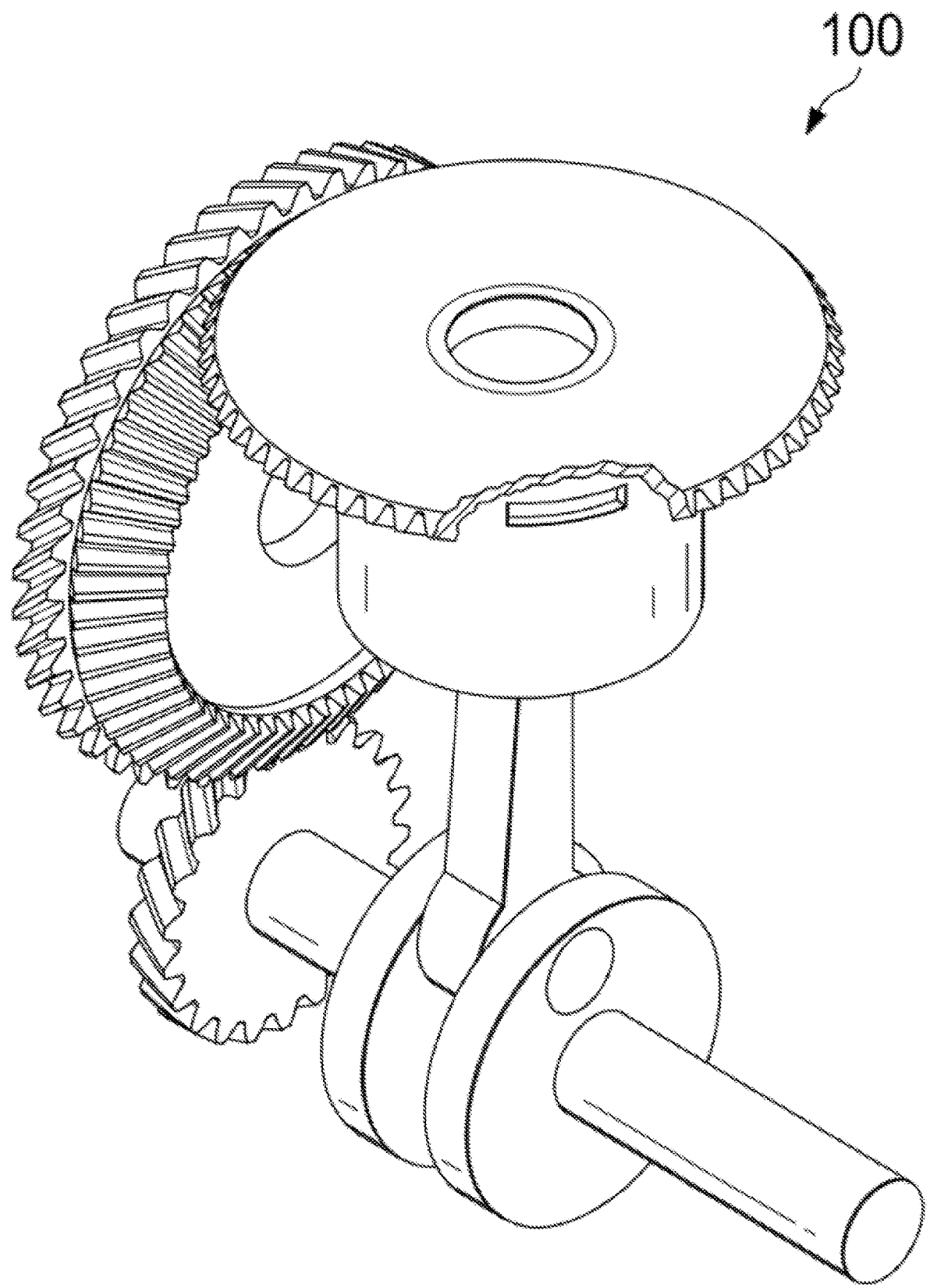
Figure 10:
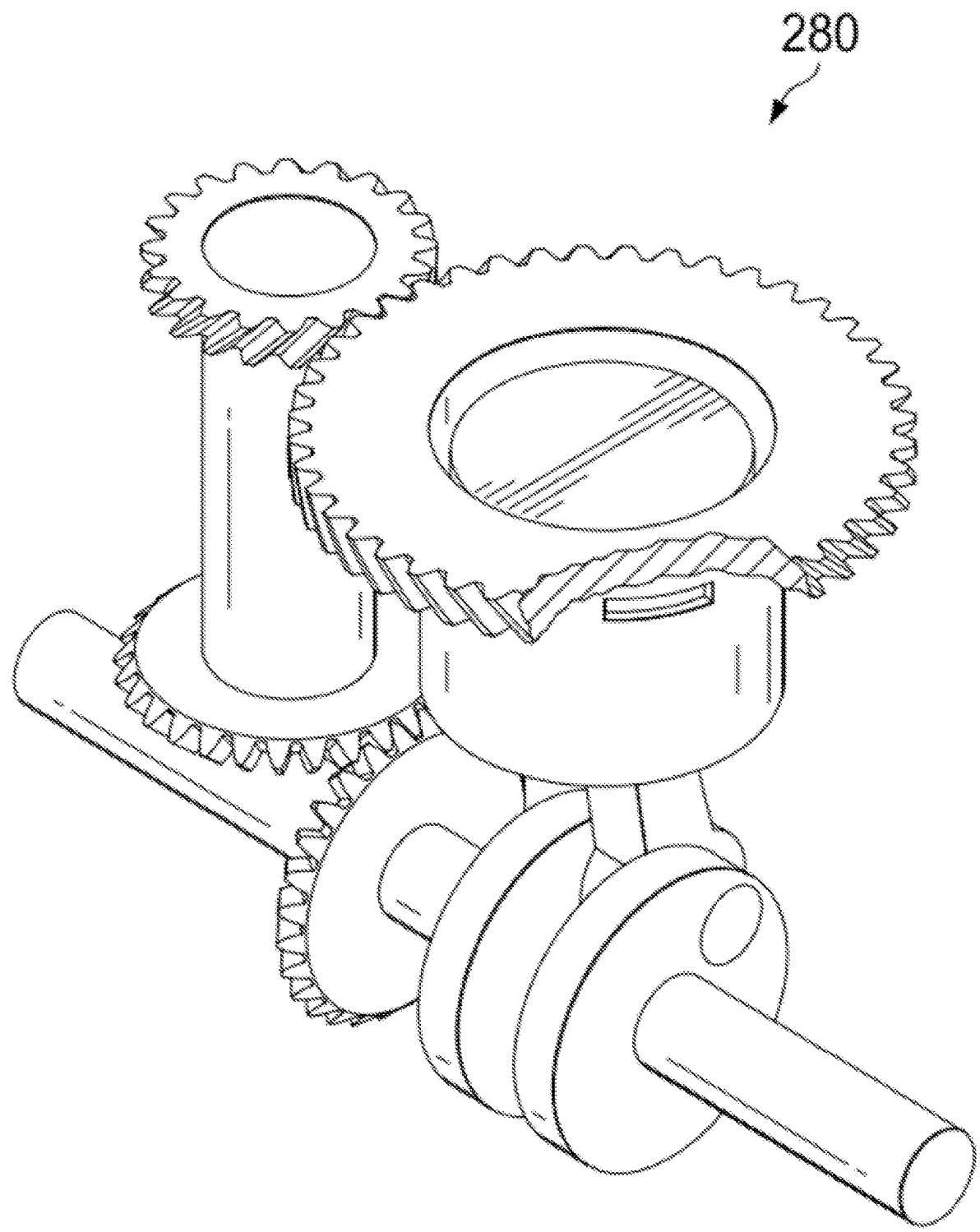

RVP-4 (100) in FIG. 4 and RVP-10 (280) in FIG. 10 are variations or alternate embodiments of the side-placement of the rotating port, in which the port is formed in a downward-disposed cylindrical extension of a rotating gear whose axis of rotation is along a centerline of the engine cylinder. These two embodiments differ in the combination of driven gears coupling the rotating gear to the crankshaft. RVP-4 (100) in FIG. 4 employs a single drive gear; RVP-10 (280) in FIG. 10 employs first and second small drive gears disposed on opposite ends of an intermediate cylindrical coupling tube.

Figure 5:
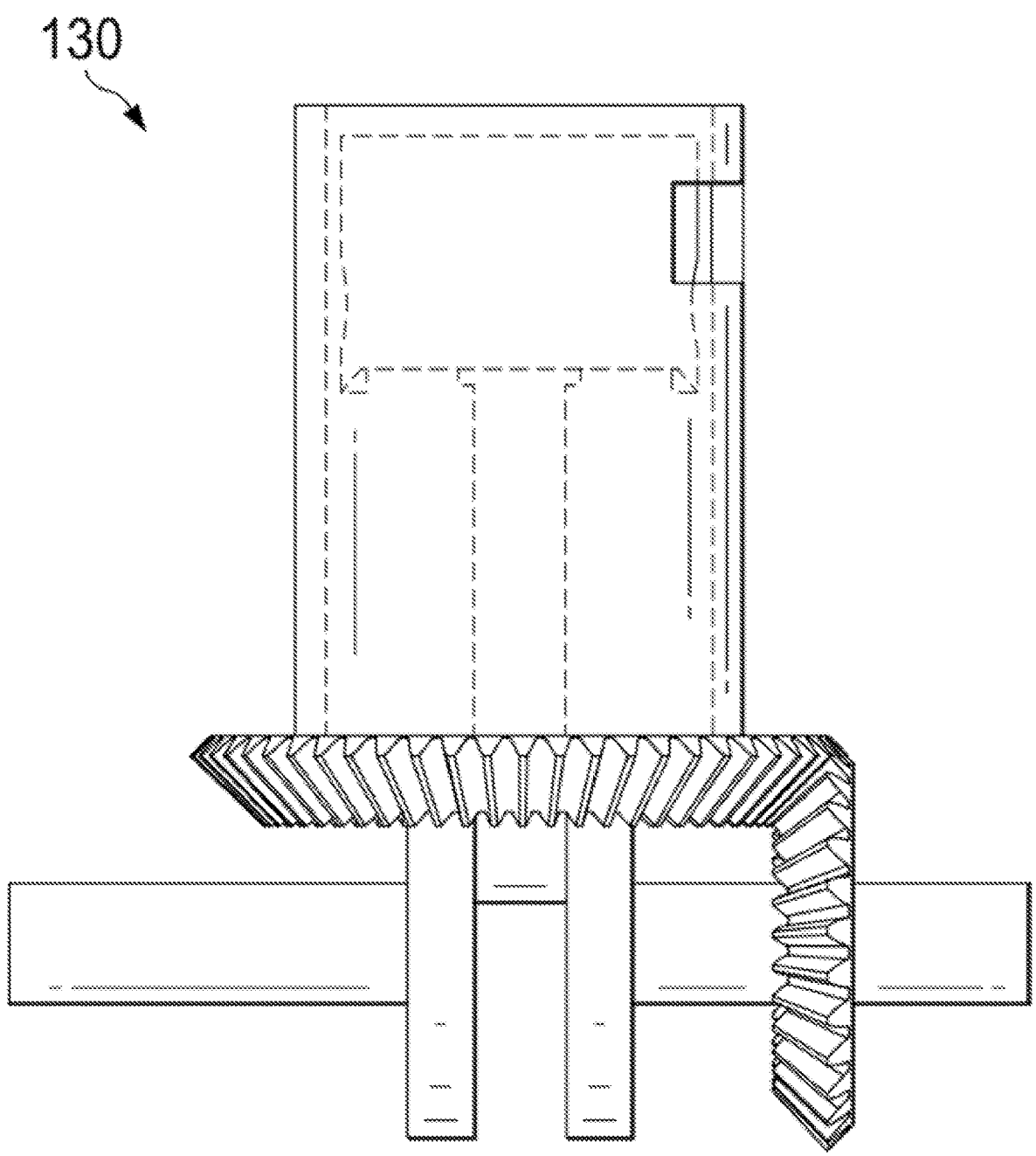
Figure 8:
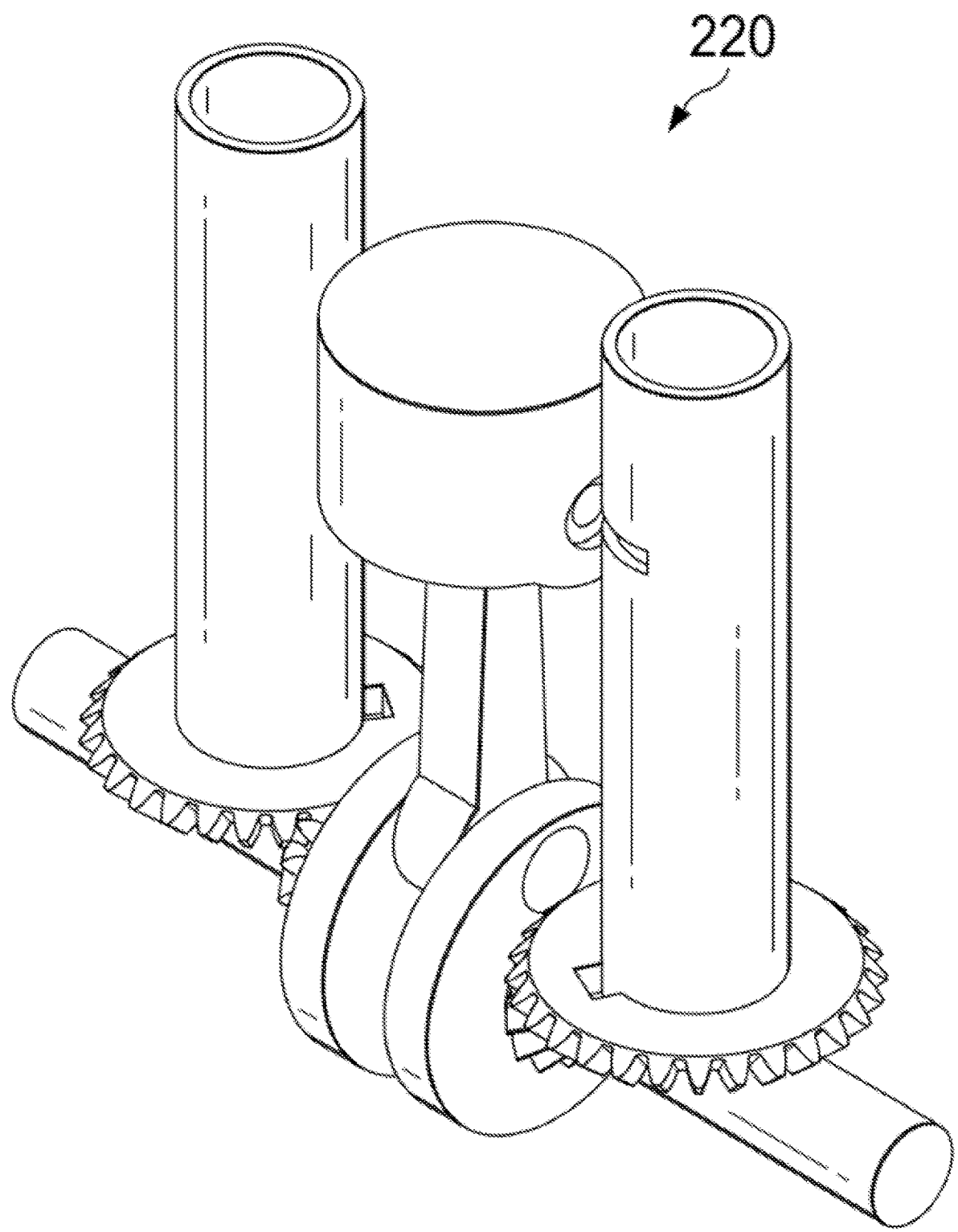

RVP-5 (130) in FIG. 5 and RVP-8 (220) in FIG. 4 are variations or alternate embodiments of the side-placement of the rotating port in which the rotating port is formed in the wall of a cylinder that rotates on an axis coincident (RVP-5) in FIG. 5 or parallel (RVP-8) in FIG. 8 with the axis of the engine cylinder and periodically positions the rotating port in alignment with the fixed port in the side wall of the engine cylinder. RVP-5 (130) places the rotating cylinder alongside the engine cylinder on an axis of rotation separate from the engine cylinder. RVP-8 (220) places the rotating cylinder around the engine cylinder such that its axis of rotation is shared with—i.e., coincident with—the axis of the engine cylinder.

Of the ten configurations depicted in FIG. 1, two examples of a side-placement of the rotating valve port will be described in FIG. 11 and FIG. 14; similarly, two species of a top-side placement of the rotating valve port will be described in FIG. 12 and FIG. 13. All of the examples use similar concepts and components in structure and operation. Each of the components is identified by a reference number and bears the same reference number if shown in more than one figure. However, FIG. 11, FIG. 12, FIG. 13, and FIG. 14 omit the engine cylinder in the isometric views for clarity. Reference to FIG. 15, which depicts the engine cylinder 310 and a cylinder head 330 in cross section, illustrates the relationship of the cylinder valve ports 322 (intake) and 326 (exhaust) in the engine cylinder 310.

Figure 11:
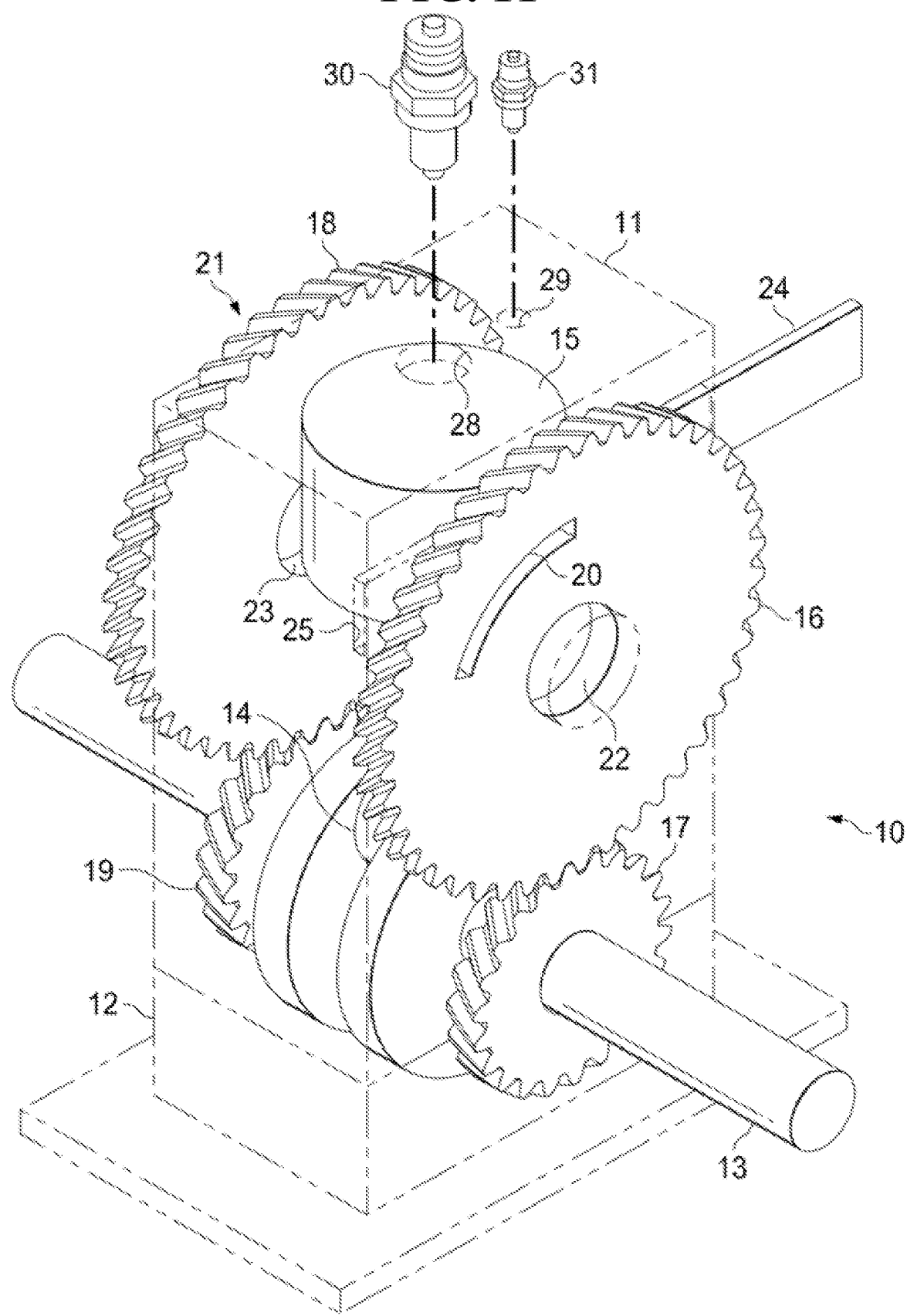
FIG. 11 illustrates an isometric view of a first embodiment of the present invention.

FIG. 11 illustrates an isometric view of a first embodiment RVP-1 (10) of the present invention, an example of an engine assembly 10 having a side-placement of the rotating valve port concept. The engine assembly 10 includes in outline an engine block 11, a crankcase 12, and a crankshaft 13 supported in the junction of the engine block 11 and crankcase 12. A piston 15 is coupled to the crankshaft 13 by a connecting rod 14 for reciprocating motion within the engine cylinder 310 (Sec FIG. 15). On a first side of the assembly 10 is a rotating gear 16 that meshes with a drive gear 17 on the crankshaft 13 such that the rotating gear 16 rotates next to the first side of the engine cylinder 310. In the rotating gear 16 an intake port 20 is formed through the body of the rotating gear 16, and the rotating gear 16 rotates about an axis on a center 22. Similarly, on a second side of the assembly 10 is a rotating gear 18 that meshes with a drive gear 19 on the crankshaft 13 such that the rotating gear 18 rotates next to the second side of the engine cylinder 310. In the rotating gear 18 an exhaust port 21 (not visible in this view, but see, e.g., FIG. 15) is formed through the body of the rotating gear 18, and the rotating gear 18 rotates about an axis on a center 23.

Continuing with FIG. 11, a multi-stage throttle valve ("MS valve") is shown withdrawn from a passage 25. The MS valve may be positioned between the rotating intake valve port 20 and the fixed intake valve port in the wall of the engine cylinder 310 (See FIG. 15) and configured to vary the cross sectional area of the passage through the intake into the engine cylinder 310. Operation of the valve 24 will be described in FIG. 8. An aperture 28 may be threaded and provided for a spark plug 30 or other energetic ignition component such as a laser igniter. Another aperture 29 may be threaded and provided for a fuel injector 31 when direct fuel injection is provided, which is preferred in the illustrated embodiment. As well-known in the art, the fuel may be introduced or injected into a port or manifold passage to be mixed with the incoming air before it is admitted through an intake port into the engine cylinder. Another example of the latter would be a throttle-body injection structure, where both a throttle valve and a fuel injector are disposed along an intake port of a manifold, in the manner of a conventional carburetor.

FIG. 12 illustrates an isometric view of a second embodiment RVP-2 of the present invention, an example of a top-side placement of the rotating valve port concept. The engine assembly 40 includes in outline an engine block 41, a crankcase 42, and a crankshaft 43 supported in the junction of the engine block 41 and crankcase 42. A piston 45 is coupled to the crankshaft 43 by a connecting rod 44 for reciprocating motion within the engine cylinder 310 (See FIG. 15). On a first side of the assembly 40 is a rotating gear 46 that meshes with a drive gear 47 on the crankshaft 43 such that the rotating gear 46 rotates next to the first side of the engine cylinder 310. On the rotating gear 46 an intake port 50 is formed in a cylindrical ring—a short cylindrical extension 52 of the rotating gear 46, and the rotating gear 46 rotates about an axis on a center 54. Similarly, on a second side of the assembly 40 is a rotating gear 48 that meshes with a drive gear 49 on the crankshaft 43 such that the rotating gear 48 rotates next to the second side of the engine cylinder 310. In the rotating gear 48 an exhaust port 51 is formed in a short cylindrical extension 53 of the rotating gear 48, and the rotating gear 48 rotates about an axis on a center 55.

Continuing with FIG. 12, a multi-stage throttle valve 56 is shown withdrawn from a passage 57. The valve 56 may be positioned between the rotating intake valve port 50 and the fixed intake valve port (See FIG. 15) in wall of the engine cylinder 310 and configured to vary the cross sectional area of the passage through the intake into the engine cylinder 310. Operation of the valve 56 will be described in FIG. 8. An aperture 58 may be threaded and provided for a spark plug 60 or other energetic ignition device. Another aperture 59 may be threaded and provided for a fuel injector 61.

FIG. 13 illustrates an isometric view of a third embodiment RVP-6 of the present invention, in a second example of a top-side placement of the rotating valve port concept. It is drawn with a perspective to depict the rotating valves more clearly by locating the respective gears on the back side of the view in FIG. 13. The engine assembly 160 includes in outline an engine block 161, a crankcase 162, and a crankshaft 163 supported in the junction of the engine block 161 and crankcase 162. A piston 165 is coupled to the crankshaft 163 by a connecting rod 164 for reciprocating motion within the engine cylinder 310 (See FIG. 15).

Continuing with FIG. 13, on a first side of the assembly 160 is a rotating gear 166 that is coupled through idler gears 167B and 167A to a drive gear 167 disposed on the crankshaft 163 such that the rotating gear 166 causes the cylindrical extension 170 attached to the rotating gear 166 along their common axis to rotate and position the rotating port aperture 171 formed in the cylindrical extension 170 to align with the fixed port in the top side of the engine cylinder 310. Similarly, a second rotating gear 168 may also be coupled through the idler gears 167B and 167A to the drive gear 1167 disposed on the crankshaft 163 such that the rotating gear 168 causes its cylindrical extension 172 attached to the rotating gear 168 along their common axis to rotate and position the rotating port aperture 173 formed in the cylindrical extension 172 to align with the fixed port in the top side of the engine cylinder 310. The multi-stage valve 174 shown in this view reciprocates in the multi-stage valve port 175 similar to the multi-stage valves shown in FIG. 12. An aperture 178 may be threaded and provided for a laser igniter or spark plug 180, Another aperture 179 may be threaded and provided for a fuel injector 181.

A word about implementation of RVP-6 and RVP-7, shown in FIG. 1 with a second lower (intermediate) idler gear and a first upper (intermediate) idler gear 167A for transferring the rotation of the crankshaft to the rotating valve gears 166 and 168. Two idler gears are shown as one preferred configuration that avoids more difficult space considerations likely if a single idler gear is used. Another issue is the gear ratios necessary to synchronize the valve operations with the four cycle or two cycle timing sequences. It will also be noted that the second rotating valve gear 168 may be offset from the plane of the first rotating valve gear 166 to permit them being driven by the same drive-and-idler gear configuration. These and other related issues will be discussed further during the description of FIG. 24.

FIG. 14 illustrates an isometric view of a fourth embodiment RVP-8 of the present invention, in a second example of a side-placement of the rotating valve port concept. FIG. 14, the isometric view, will be described with reference to FIG. 15, a side cross section view, in the following description. The engine assembly 220 includes in outline an engine block 221, a crankcase 222, and a crankshaft 223 supported in the junction of the engine block 221 and crankcase 222. A piston 225 is coupled to the crankshaft 223 by a connecting rod 224 for reciprocating motion within an engine cylinder. An engine cylinder is not shown in FIG. 14 for clarity of these engine structures. However, reference to FIG. 15 depicts a side cross section view of an engine cylinder 310 that is typical of the Type A side-placement embodiments defined previously, which includes a second port 322 (Bar the intake side) and a second port 326 (for an exhaust side) disposed through the wall of the engine cylinder 310.

Continuing with FIG. 14, a first side of the assembly 220 is a rotating gear 226 that meshes with a drive gear 227 on the crankshaft 223 such that the rotating gear 226 causes the cylindrical extension 242 attached to the rotating gear 226 along their common axis to rotate and position the rotating port aperture 230 (see also the rotating port 320 in FIG. 15) formed in the cylindrical extension 242 to align with an intake port such as the intake port 322 disposed in the wall of the engine cylinder 310 as shown in FIG. 15. The intake port 322 may be disposed in the upper portion of the engine cylinder 310 leading directly into the combustion chamber 336 above the piston 225 of FIG. 14 (or the piston 308 in FIG. 15). Similarly, a second rotating gear 228 may also be coupled to the drive gear 229 disposed on the crankshaft 223 such that the second rotating gear 228 causes its cylindrical extension 243 attached to the second rotating gear 228 along their common axis to rotate to cause the rotating port aperture 231 formed in the cylindrical extension 243 to align with an exhaust port in the wall of the engine cylinder as is the exhaust port 326 in the engine cylinder 310 of FIG. 15. The exhaust port 326 may be disposed in the upper portion of the engine cylinder 310 leading directly out of the combustion chamber 336.

The inlet and outlet passages for the inlet air/fuel mixture and the exhaust waste gases (not shown in FIG. 14) may be disposed to enter through one side of the respective valve cylinder for coupling with the respective valve port inside the valve cylinder. The valve timing may be set by the number of teeth on the gears, with the valve cylinder extensions rotating at one-half the crankshaft speed in a four cycle engine. The valve cylinder extensions as depicted in the Figures may be supported in cylindrical bearing surfaces whose diameter is slightly greater than the diameter of the valve cylinders. The valve cylinders may be lubricated by a connection (not shown) with the pressurized lubrication system of the engine in a manner similar to the lubrication of the crankshaft journal bearings that support the crankshaft in the crankcase. The axial length of the valve cylinders may be varied depending on the size of the valve port opening, the space available in the engine block, the position of the second (fixed port in the wall of the engine cylinder, etc. However, to minimize friction and the loading on the rotating element, the axial length may generally be less than shown in FIG. 13 or 5.

FIG. 15 illustrates a schematic cross section of a conceptual embodiment of a single cylinder internal combustion engine 300 having rotating valve ports according to the present invention. A representation of an engine block 302 includes a crankshaft 304, and a connecting rod 306 connected to the lower end of a piston 308 for imparting reciprocating motion within a cylinder 310. Included next to the walls of the cylinder 310 is a first rotating valve gear 312 driven by a first drive gear 314 on the crankshaft 304. Similarly, a second rotating valve gear 316 is driven by a second drive gear 318 also connected to the crankshaft 304. The rotating valve gear 312 includes an intake valve port 320 aligned with an intake port 322 in the upper portion of the wall of the cylinder 310 just below the cylinder head 330. The rotating valve gear 316 includes an exhaust valve port 324 aligned with an exhaust port 326 in the upper portion of the wall of the cylinder 310 just below the cylinder head 330. An energetic ignition component such as a laser igniter (not shown) or spark plug 332 for igniting the air/fuel mixture is disposed in the top side of the cylinder head 330 and extending into a combustion chamber 336.

Continuing with FIG. 15, the first rotating valve port 312 may rotate on an axle stub or shoulder bolt 338 set through a bushing 340 into a tapped hole 342 in the wall of the engine cylinder 310. Similarly, the second rotating valve port 316 rotates on an axle stub or shoulder bolt 344 set through a bushing 346 into a tapped hole 348 in the wall of the engine cylinder 310. The axes of rotation of the rotating valve ports 312, 316 are defined respectively by the shoulder bolts 338 and 344.

Sealing the rotating valve port structure to contain leakage of intake or exhaust mixtures or gases may be developed from several alternatives. As is well-known, sealing the space between an engine cylinder and a piston is provided by piston rings, usually one for controlling the dispersion of lubricating oil and one or two others for preventing combustion gases from entering the crankcase and maintaining the pressure within the cylinder during the two or four cycles of the ICE operation. Other alternatives include gaskets and O-rings.

FIG. 16 illustrates a side view of an engine cylinder 310 as formed in the embodiment of FIG. 11. An intake side face 352, and the exhaust side face 354 are machined flat on opposite sides of the wall of the engine cylinder 310 to provide a smooth surface to receive a sealing mechanism formed by an inner gasket 356 and an outer compression ring 358, which are disposed between the side of the engine wall around the intake port 322 and the exhaust pert 326 respectively. In an alternate embodiment the compression ring 358 may be replaced by a sealing ring by applying a heat-resistant synthetic compound or gasket in the groove formerly occupied by the compression ring 358. The groove for a sealing ring may be machined in the face of the rotating valve disc or the wall of the engine cylinder 310 to provide the sealing structure shown in FIG. 16. In some embodiments the gasket may be an O-ring specifically shaped to fit the machined groove.

In another alternate embodiment, the effectiveness of the seal may be enhanced by coating the facing surfaces of the wall of the engine cylinder 310 and the rotating member embodying the rotating valve port with a high-temperature ceramic material such as a ceramic paint, a powder coating with embedded ceramic material that can be electrostatically applied, or a powder coating alone. The coating may also be applied to the Multi-Stage valve structure to be described in FIG. 17, FIG. 18, FIG. 19, FIG. 20, FIG. 21, and FIG. 22. These ceramic or powder coating materials may provide a surface finish that is more resistant to wear, thereby reducing the heat build-up through reduced friction between the rotating valve port member and the side wall of the engine cylinder.

Other methods or structures for seating the RVP mechanisms may include machined ridges and/or grooves in the surfaces of the wall of the engine cylinder or the face of the rotating valve. For example, the inside face of the rotating valve disc may be equipped with two concentric cylindrical extensions or rings, radially-disposed on either side of the valve port formed in the rotating valve disc. The seal may be completed by forming corresponding grooves in the wall of the engine cylinder to receive the cylindrical extensions (rings). Another example using this ridge-and-groove concept is illustrated in FIG. 37. In FIG. 37, the wall of the engine cylinder around the border of the second valve port may be machined to include a small ridge no larger than about 0.040-inch above the surface of the wall of the engine cylinder; and the face of the rotating valve disc may be inset by the same 0.040-inch depth between radii that straddles the radial dimensions of the first valve port in the rotating disc. When assembled, any leakage is contained within the space between the wall of the engine cylinder and the inset face of the rotating disc and bounded by the outer and inner sides of the inset space. This example may be identified as the combination of a ridge around the (fixed) second port and a facial inset around the first (rotating) valve port. It is an example that reduces the required machining to a minimum by including it during the manufacture of the engine cylinder and the rotating valve disc themselves.

In one variation of the structure depicted in FIG. 37, the inset region may be formed in the inner face of the rotating, valve disc and the ridge or elevated feature formed in the outer face of the wall of the engine cylinder.

FIG. 8 illustrates four views, FIG. 17, FIG. 18, FIG. 19, and FIG. 20, of a multi-stage valve system 360 for use in the embodiment of FIG. 11. Each diagram includes a rotating valve gear 16 and a respective valve port 20. The multi-stage valve ("MSV") system, which is used to vary the cross sectional area of the rotating valve ports 320, 324, provides a way to regulate operation of the RVP engine. The MSV (or MS valve) may be used as a throttle when disposed as part of the rotating intake valve apparatus of the engine. It may also be used to regulate the cross sectional area of the exhaust valve port, not as a throttle valve but for purposes associated with the temperatures of the combustion chamber 336 and the exhaust gases, the emission levels of the engine exhaust, etc. These parameters may be controlled through an appropriate mechanical linkage by computer control that may be configured by software, for example, FIG. 17, FIG. 18, FIG. 19, and FIG. 20 depict four views or states of one embodiment of the multi-stage valve used as a throttle controlled by engine vacuum. As will be described, the MS valve may be configured as a thin baffle attached to a vacuum diaphragm link so that it may be reciprocated toward and away from alignment with the intake valve port, thus providing a mechanism to vary the cross sectional area of the intake valve port into the cylinder thereby to act as a throttle valve.

Figure 17:
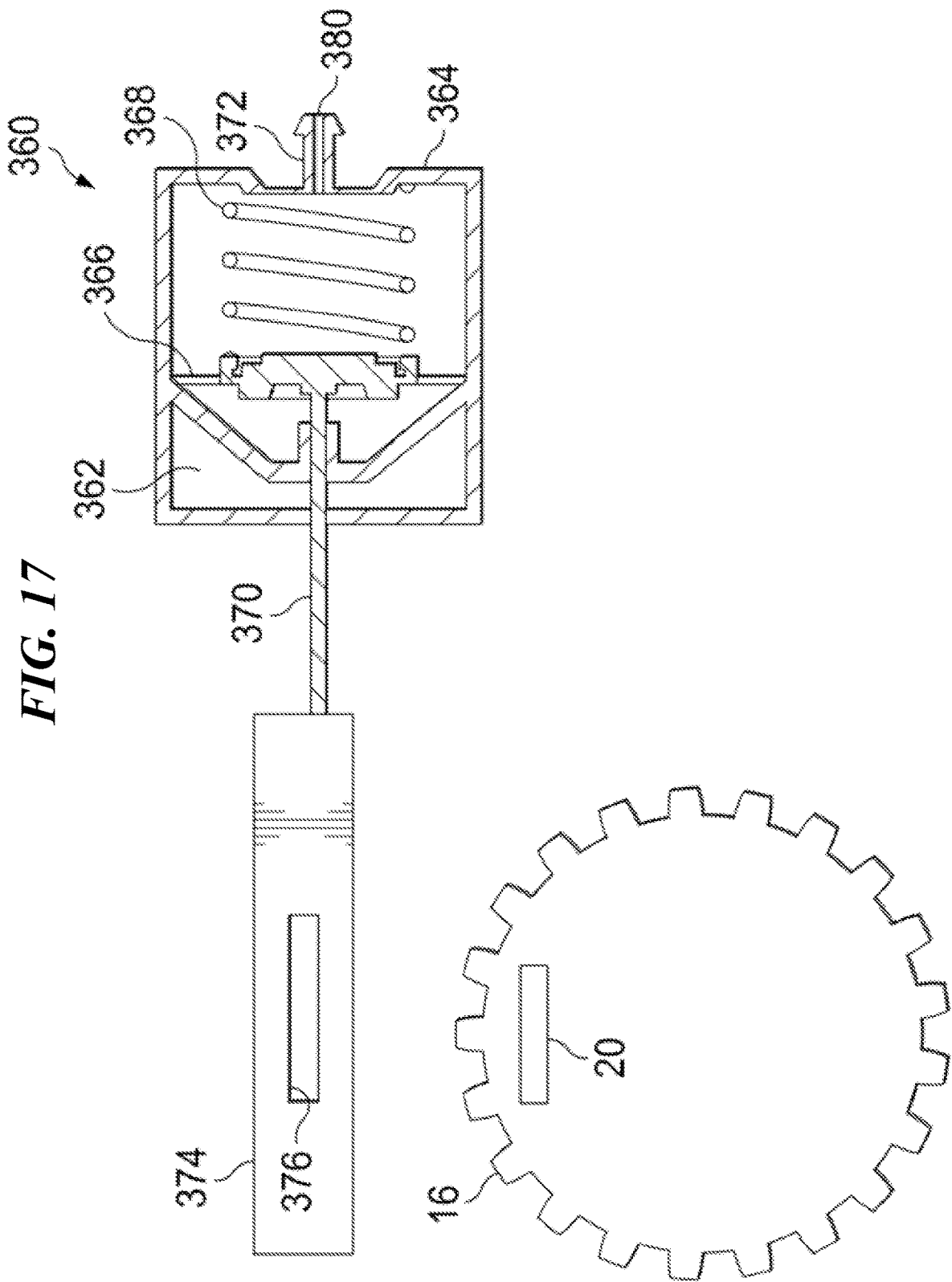
Figure 18:
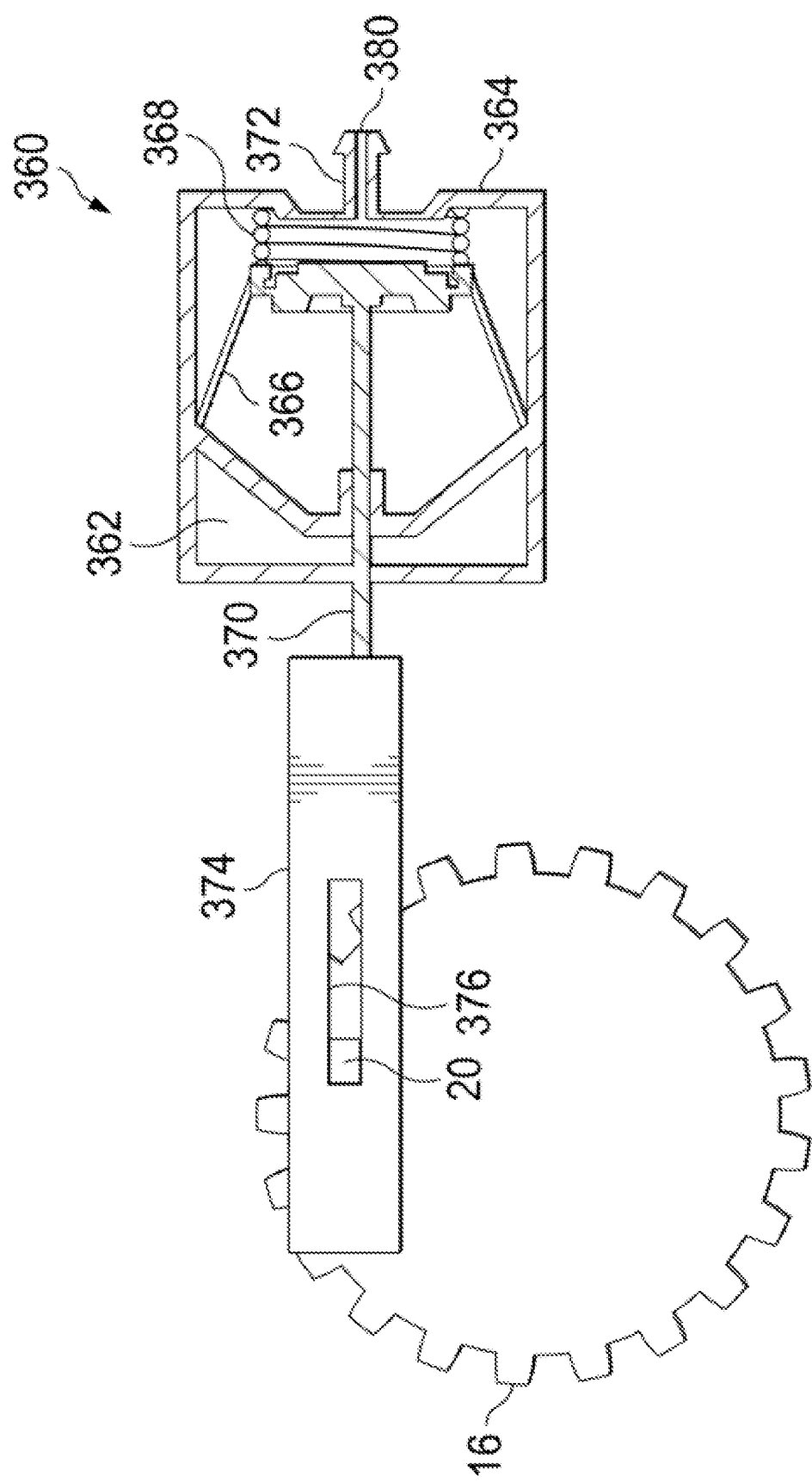
Figure 19:
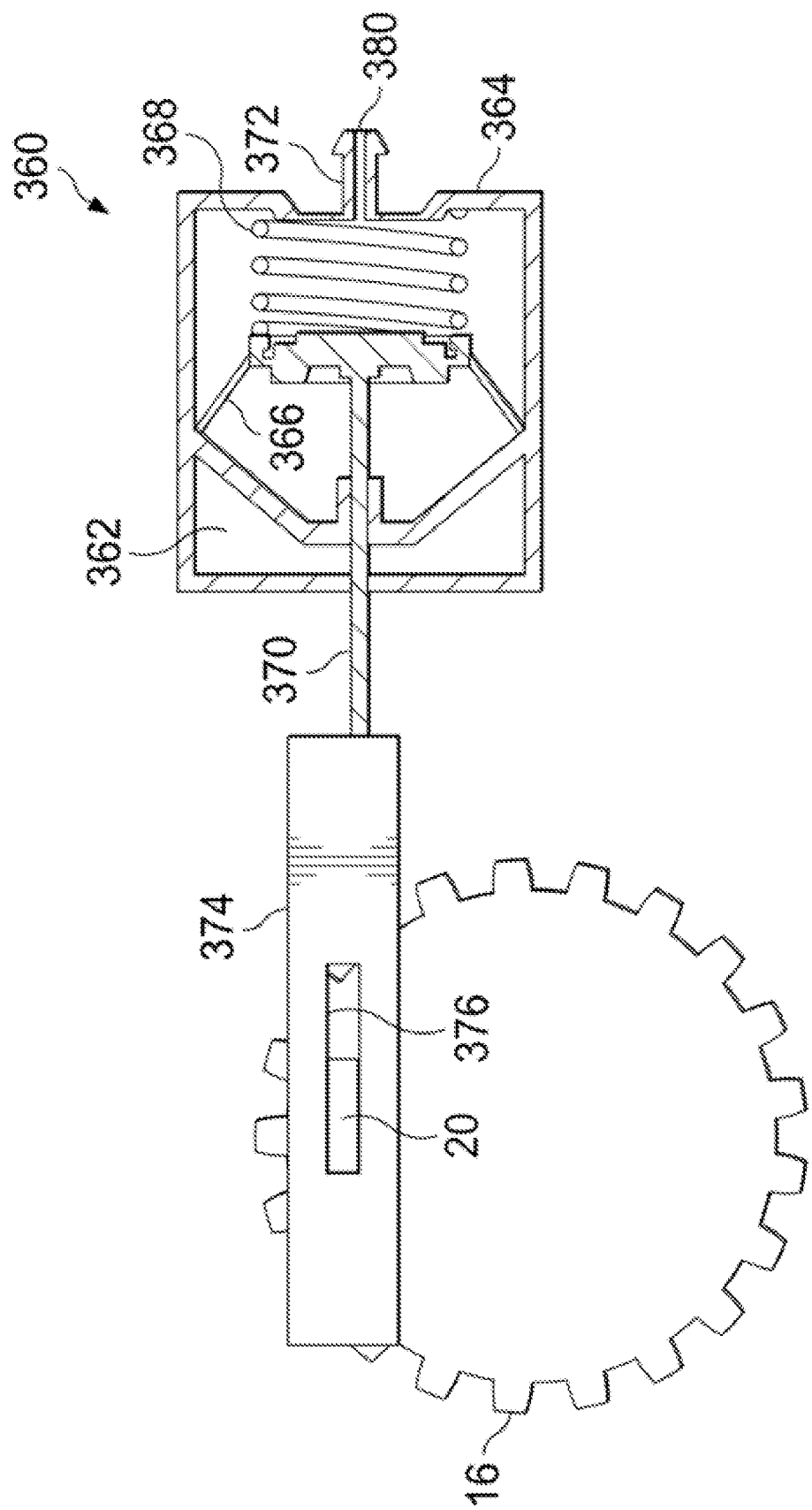

Continuing with FIG. 17, a vacuum diaphragm assembly 362 includes a housing 364, a vacuum diaphragm 366, a return spring 368, and an operating rod 370 connected at one end to the vacuum diaphragm 366 and the return spring 368, both located within the housing 364. The opposite end of the operating rod 370 is connected to an MSV plate 374. A vacuum port 372 connects the interior of the vacuum diaphragm 366 to a source of vacuum 380 regulated by a throttle or "accelerator" (not shown) if the vacuum diaphragm assembly 360 is used to control the volume of air fuel mixture admitted into the combustion chamber 336 via the rotating intake valve 312. The MSV plate 374 includes a valve port 376 that may be aligned with the rotating valve port 20. Motion of the MSV plate 374 can be varied from fully withdrawn as in FIG. 17 when the engine is not operating, engine vacuum is zero and the spring 368 is fully expanded, to fully-advanced as in FIG. 20 corresponding to wide open throttle when the engine vacuum is at it's minimum level and the spring 368 is nearly fully expanded. FIG. 18 depicts the approximate position of the MSV plate 374 provided by the maximum vacuum condition that occurs when the engine is idling. FIG. 19 depicts the approximate position of the MSV plate 374 provided at a part-throttle condition such as when the vehicle or machine is operating under a moderate load. Control of the MS valve may be assisted in its advance by the return spring 368 that supplies the force to advance the MS valve, in opposition to the force applied to the vacuum diaphragm, which acts to retract the MS valve. The MS valve thus can be operated as a throttle valve to vary the engine's power output.

Figure 21:
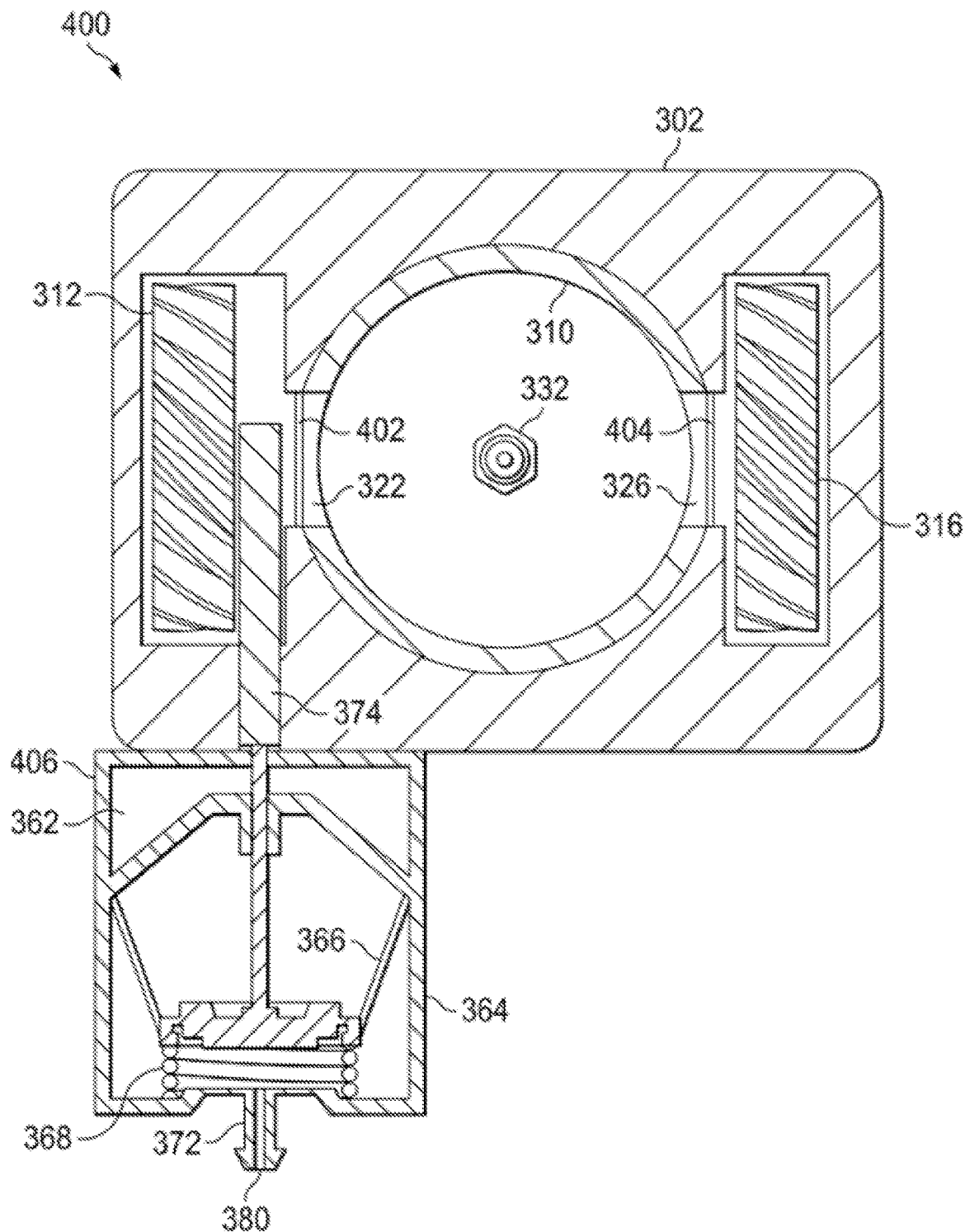
FIG. 21 illustrates a top-down view of a cross section of an engine cylinder according to the embodiment of FIG. 11 that includes the multi-stage throttle valve system depicted in FIG. 8 in a closed-throttle state.

FIG. 21 illustrates a top-down view of a cross section of an engine cylinder 310 according to the embodiment of FIG. 11 that includes an MS intake valve 374 depicted in FIG. 17 in a closed-throttle state. The representation of an engine block 302 includes the engine cylinder 310 and its associated intake 322 and exhaust 326 ports formed in the walls of the engine cylinder 310. The rotating valve gear 312 is shown adjacent the engine cylinder 310. Similarly, a rotating valve gear 316 is shown adjacent the exhaust valve port 326. Also shown FIG. 21 are edge-wise views of the location of first (intake) 402 and second (exhaust) 404 seals disposed between the adjacent wall of the engine cylinder 310 and the rotating valve gear. The seal structure is described briefly in FIG. 16. Disposed next to the engine block 302 is one embodiment of as vacuum diaphragm assembly 362 supported by a bracket 406.

Figure 20:
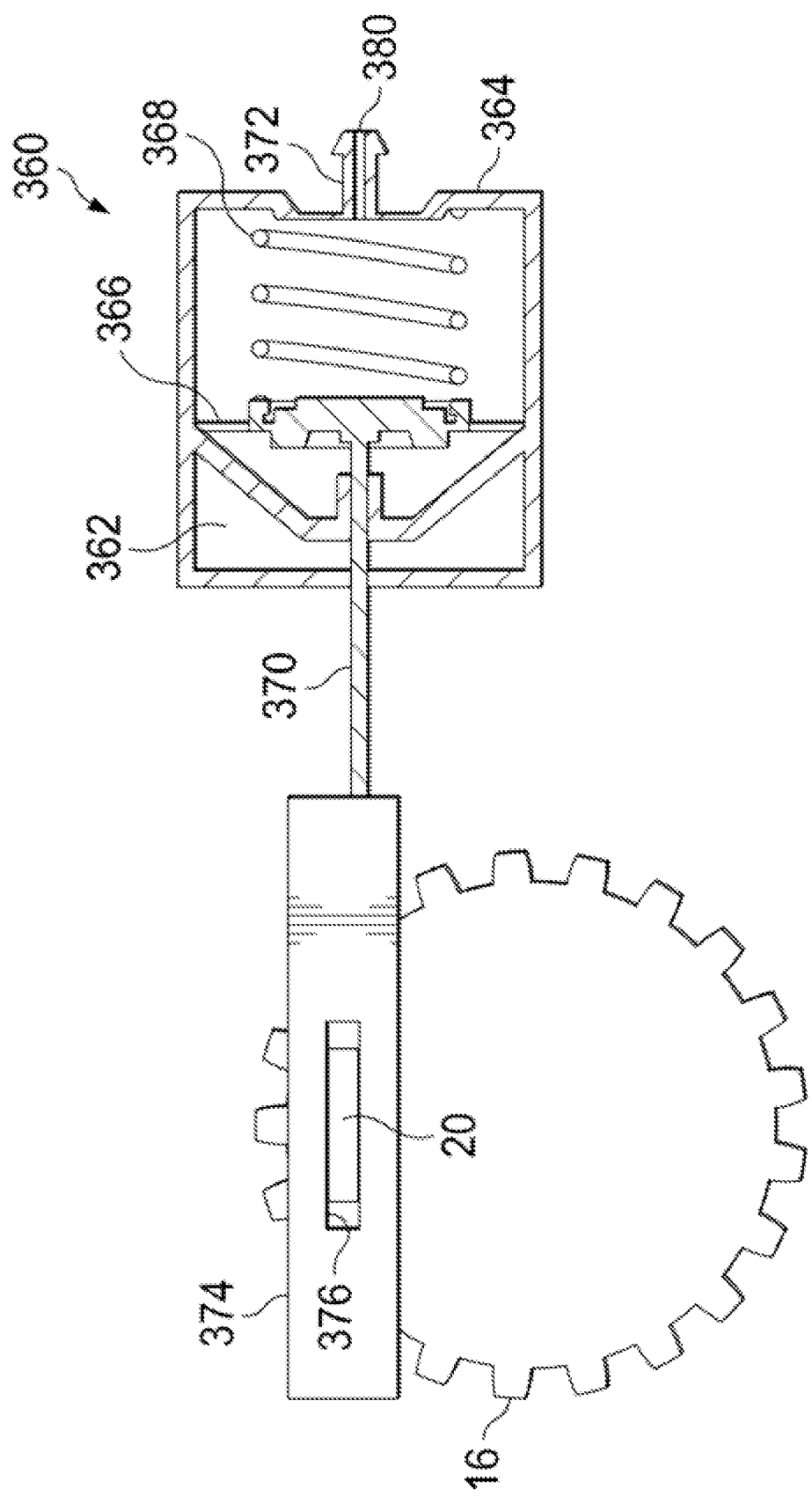
Figure 22:
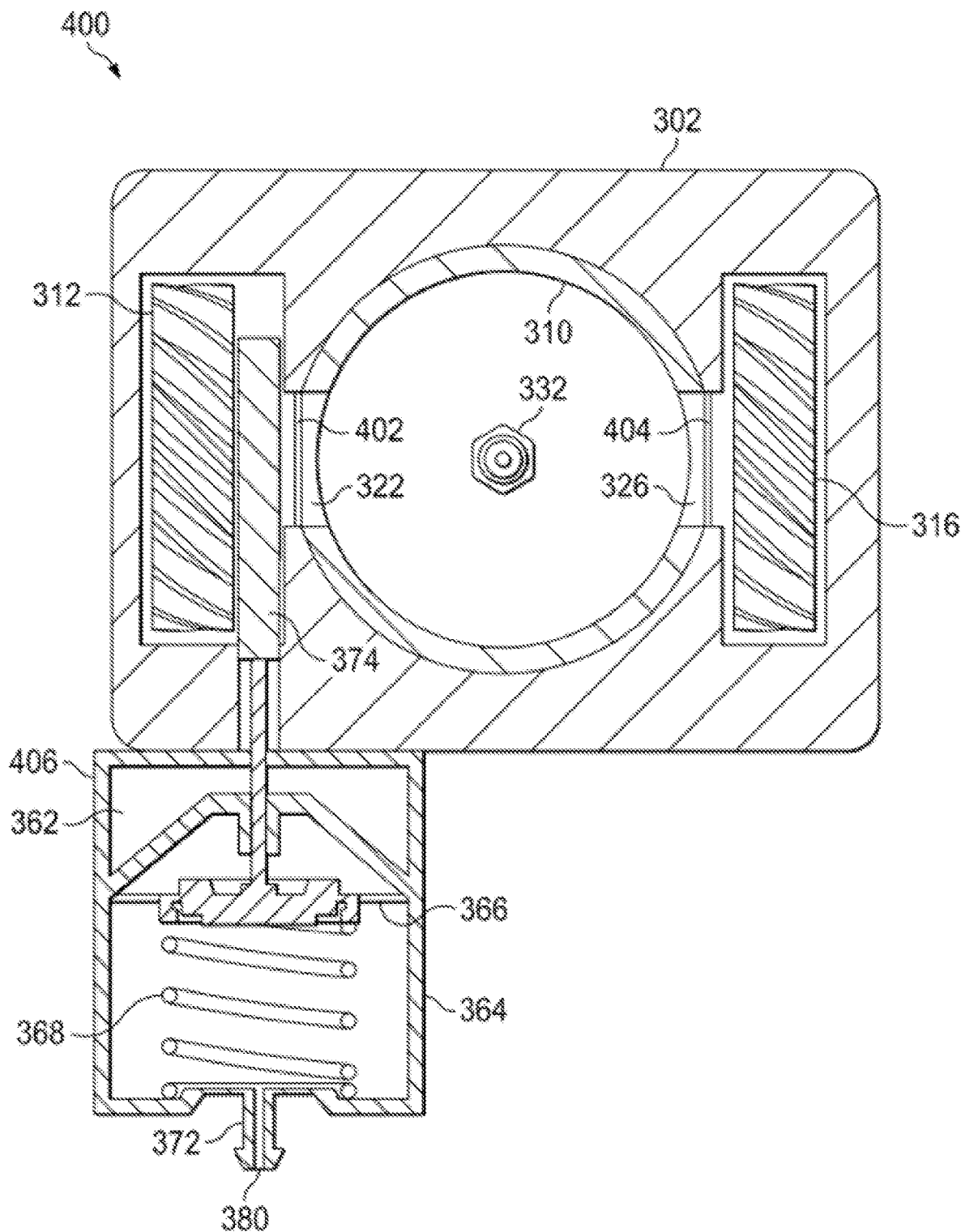
FIG. 22 illustrates a top-down view of a cross section of an engine cylinder according to the embodiment of FIG. 11 that includes the multi-stage throttle valve system depicted in FIG. 8 in an open-throttle state.

FIG. 22 illustrates a top-down view of a cross section of an engine cylinder according to the embodiment of FIG. 11 that includes an MS intake valve depicted in FIG. 20 in a wide-open throttle state. As in FIG. 21, the representation of an engine block 302 includes the engine cylinder 310 and its associated intake 322 and exhaust 326 ports formed in the walls of the engine cylinder 310. The rotating valve gear 312 is shown adjacent the engine cylinder 310. Similarly, a rotating valve gear 316 is shown adjacent the exhaust valve port 326. Also shown in FIG. 21 are edge-wise views of the location of first (intake) 402 and second (exhaust) 404 seals disposed between the adjacent wall of the engine cylinder 310 and the rotating valve gear. The seal structure is described briefly in FIG. 16. Disposed next to the engine block 302 is one embodiment of a vacuum diaphragm assembly 362 supported by a bracket 406.

FIG. 23 illustrates a simplified isometric view of a lower portion of the cylinder head assembly formed of a cylinder head 436 and a cylinder head cover 438 of the embodiment of FIG. 13 depicting first 434 and second 444 cylindrical extensions, respectively of rotating valve gears 454 and 464 (not shown in FIG. 23 but see FIG. 24). The cylinder head cover 438 is shown in phantom. The illustrated rotating cylindrical extension 434 includes a port aperture 442 formed through the wall of the cylindrical extension 434; similarly, cylindrical extension 444 includes a port aperture 446 formed through the wall of the cylindrical extension 444. Each cylindrical extension 434, 444 rotates on a respective bearing surface 428, 448 that are formed in the cylinder head 436. A spark plug 432 or other energetic component such as a laser igniter may be fitted into a threaded hole in the cylinder head 436. Similarly, provision may be made for a fuel injector for direct injection of fuel into the combustion chamber as discussed in FIG. 11 and FIG. 13.

The inlet and outlet passages for the inlet air/fuel mixture and the exhaust waste gases (not shown) may be disposed through one side (or end, in the elongated valve cylinders) of the respective valve cylinder to contact with the respective valve port inside the valve cylinder. The valve timing may be set by the number of teeth on the gears, with the valve cylinders rotating at one-half the crankshaft speed. The valve cylinders may be supported in cylindrical bearing surfaces whose diameter is slightly greater than the diameter of the valve cylinders. The valve cylinders may be lubricated by a connection (not shown) with the pressurized lubrication system of the engine in a manner similar to the lubrication of the crankshaft journal bearings that support the crankshaft in the crankcase. The axial length of the valve cylinders may be varied depending on the size of the valve port opening and the space available in the engine block. However, to minimize friction, the axial length may generally be less than shown in FIG. 13 or FIG. 14.

FIG. 24 illustrates a timing gear set 450 for use with the embodiment of FIG. 23. The intake rotating valve or drive gear 454 is attached to the cylindrical extension 434 along and axis common to the rotating valve gear 454 and the cylindrical extension 434. Similarly, the exhaust rotating valve or drive gear 464 is attached to the cylindrical extension 444 along and axis common to the rotating valve gear 464 and the cylindrical extension 444. The rotating drive gears 454, 464 may be disposed to mesh with an intermediate or idler gear 456, which is in turn disposed to mesh with a crankshaft gear 458. In the illustrated example, the driven rotating valve gears 454, 464 have the same number of teeth around the perimeter to preserve the 2:1 timing relationship relative to the intermediate or idler gear 456, which also has twice the number of teeth around its perimeter as the crankshaft drive gear 458, so that the 2:1 timing relationship of crankshaft rotation and rotating valve port are maintained.

FIG. 25, FIG. 26, FIG. 27, FIG. 28, FIG. 29, FIG. 30, FIG. 31, FIG. 32, FIG. 33, and FIG. 34 illustrate cross section drawings that each correspond by reference number to each of the members of the family of embodiments depicted in FIG. 1, FIG. 2, FIG. 3, FIG. 4, FIG. 5, FIG. 6, FIG. 7, FIG. 8, FIG. 9, FIG. 10. As in the series of isometric views of FIG. 1, FIG. 2, FIG. 3, FIG. 4, FIG. 5, FIG. 6, FIG. 7, FIG. 8, FIG. 9, FIG. 10, RVP 1 is identified by reference number 10; RVP 2 by reference number 40; etc. through RVP 10 identified by reference number 280 in FIG. 25, FIG. 26, FIG. 27, FIG. 28, FIG. 29, FIG. 30, FIG. 31, FIG. 32, FIG. 33, and FIG. 34.

Figure 35:
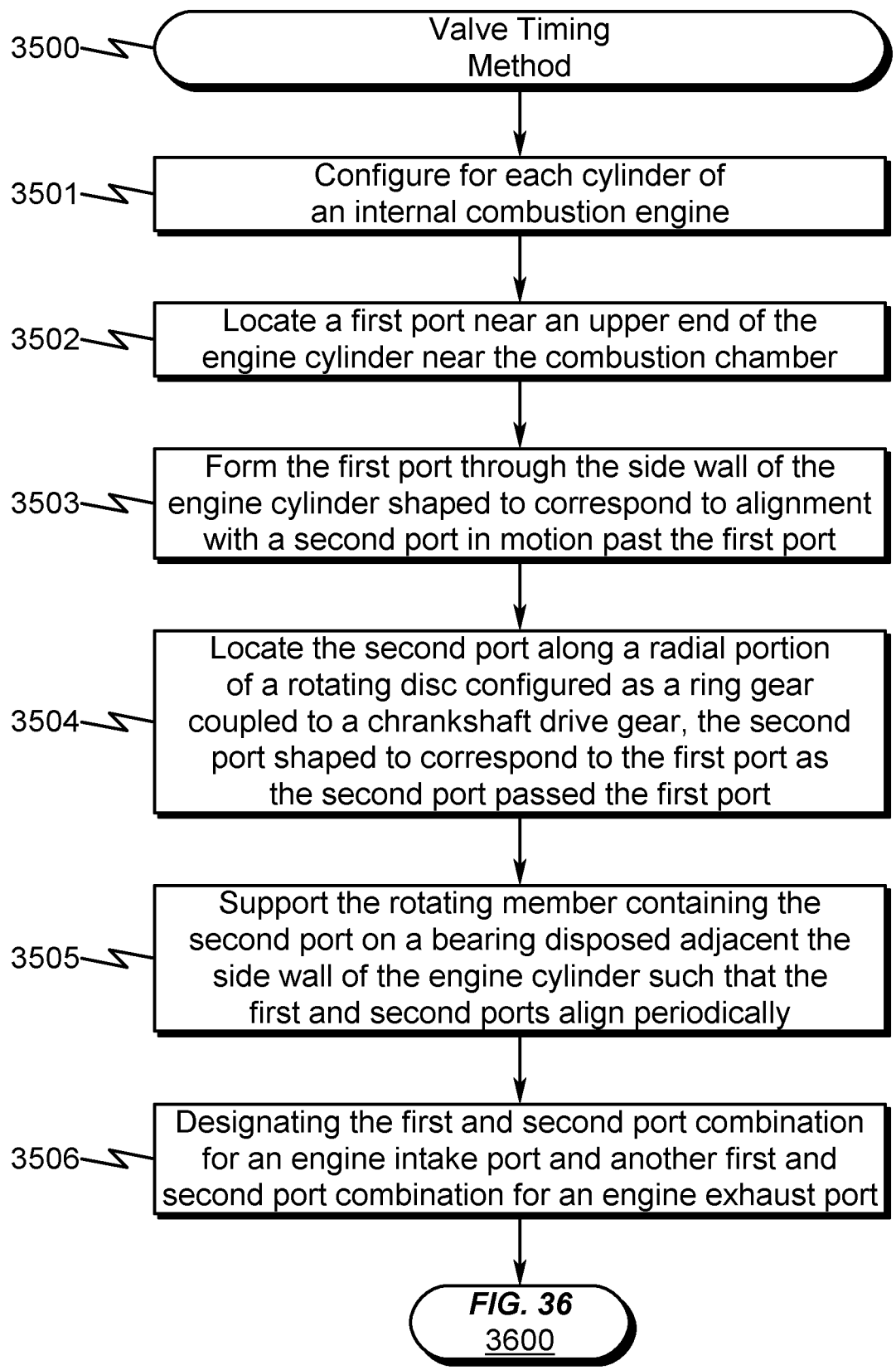
FIG. 35 and FIG. 36 illustrate a method for timing the operation of intake and exhaust to valves of an internal combustion engine according to the present invention.
Figure 36:
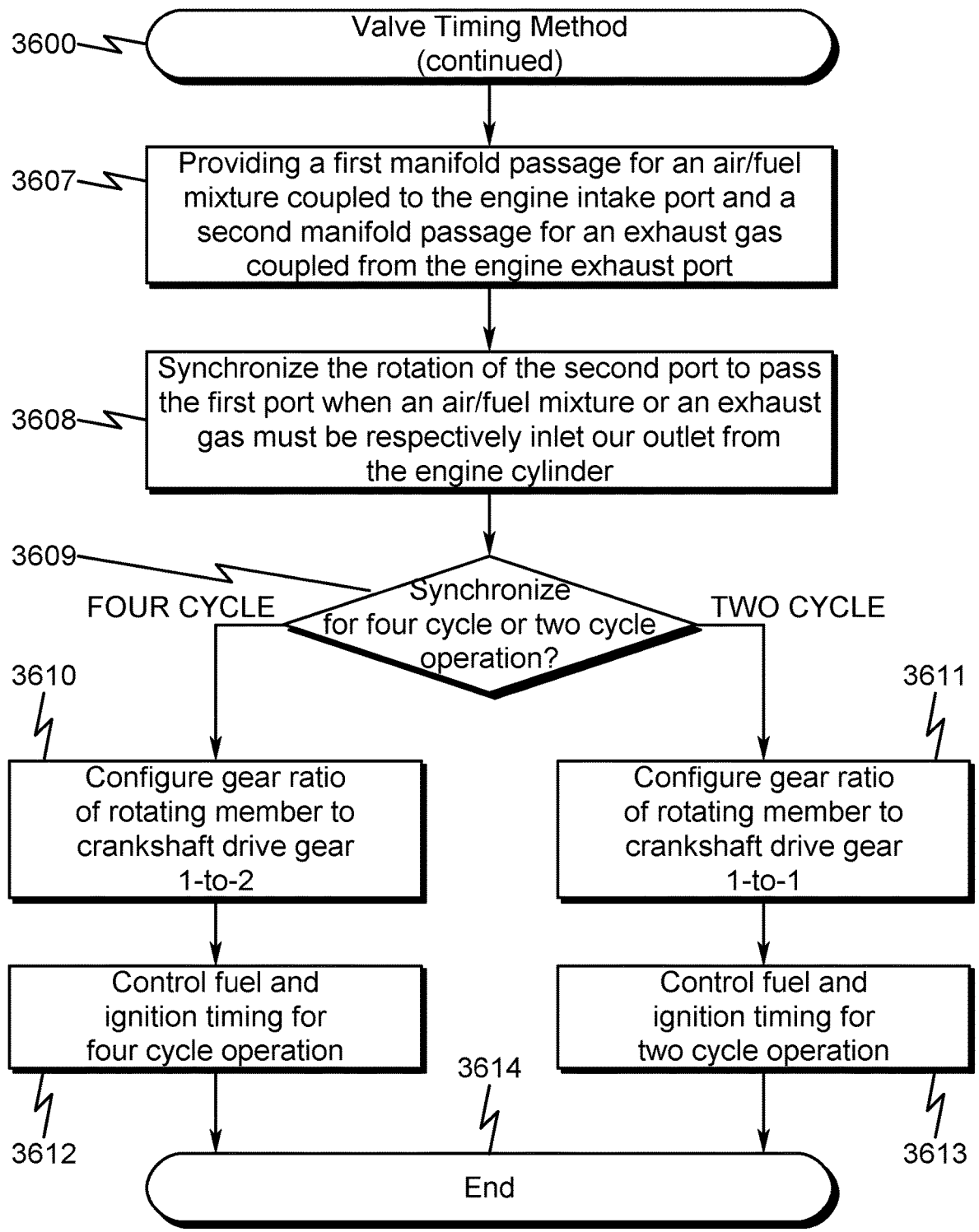

FIG. 35 and FIG. 36 illustrate a method for timing the operation of intake and exhaust valves of an internal combustion engine according to the present invention. This embodiment is directed to one of the three kinds of timing functions that must be satisfied in an internal combustion engine and depicted in the flow chart of FIG. 35 and FIG. 36. In an internal combustion engine having a crankshaft rotatably mounted in a crankcase portion of an engine block, an engine cylinder formed within the engine block and open at a lower end thereof into the crankcase, and a combustion chamber formed in an upper end of the engine cylinder, the method may comprise the steps of forming a first valve port in a side wall of the engine cylinder proximate the combustion chamber; forming a valve port mechanism having a second valve port in a rotating member disposed against the side wall of the engine cylinder; and causing the rotating member to rotate in synchronism with the crankshaft such that the second valve port periodically aligns with the first valve port to permit passage of intake or exhaust substances. In another aspect, the method may include the steps of forming first and second valve port mechanisms for the intake and exhaust substances, and disposing the respective first and second valve port mechanisms or combinations on respective first and second opposite sides of the engine cylinder to permit passage of both intake and exhaust substances. A further step may include coupling inlet and outlet passages of a manifold with the respective first and second port valve port mechanisms, respectively for conveying inlet air and outlet exhaust substances.

Accordingly, in one embodiment, the method (3500, 3600) illustrated in FIG. 35 and FIG. 36 proceeds from the Start (3500) point in FIG. 35 as follows, to configure for each cylinder of an internal combustion engine having a crankcase supported in an engine block having an engine cylinder formed therein and open at a lower end thereof into a crankcase, and a combustion chamber formed in an upper end of the cylinder as noted in step (3501). The flow advances to step (3502) to locate a first port near an upper end of the engine cylinder near the combustion chamber, followed by step (3503) to form the first port trough the side wall of the engine cylinder, shaped to correspond to alignment with a second port in motion past the first port. In step (3504), the process locates the second port along a radial portion of a rotating disc configured as a ring gear, the second port shaped to correspond with to the first port as the second port passes the first port. The process continues in step (3505) wherein the rotating member containing the second port is supported on a bearing disposed adjacent the side wall of the engine cylinder such that the first and second ports automatically align periodically.

Continuing with FIG. 35, in step (3506), one first and second port combination is designated for an engine intake port and another first and second port combination is designated as an engine exhaust port. Thus, the rotating valve port concept may be employed for both an engine intake port and an engine exhaust port. Proceeding to FIG. 36, in the following step (3607) there may be provided a first manifold passage for an air/fuel mixture coupled to the engine intake port and a second manifold passage provided for an exhaust gas coupled from the engine exhaust port. Step (3608) of the process functions to synchronize the rotation of the second port to pass the first port when an air/fuel mixture or an exhaust gas must be respectively inlet to or outlet from the engine cylinder. A related part of step (3608) includes adapting in step (3609) the synchronization for a four cycle engine or a two cycle engine. If the synchronization is for a four cycle engine the process advances to step (3610) to configure the gear ratio of the rotating member to the crankshaft at a 1 to 2 ratio, followed by step (3612) to control the fuel and ignition timing for four cycle operation of the engine. Similarly, if the synchronization is for a two cycle engine the process advances to step (3611) to configure the gear ratio of the rotating member to the crankshaft at a 1 to 1 ratio, allowed by step (3613) to control the fuel and ignition timing for four cycle operation of the engine. Thereafter, the process ends at step (3614).

FIG. 37 depicts one embodiment of a sealing structure 540 that confines leakage gases to the immediate region around the joint in the port passages between the rotating, and fixed portions of the port structure. The engine block 550 includes an engine cylinder 552 and a second fixed port 554 formed in an inset region 560 of the face 564 of the engine block 550. The face 564 in this example is coincident with and may also be called the outer wall of the engine cylinder 552. The inset region 560 may be defined by a low elevation ridge 562 formed between an axle 572 and a position just beyond the location of the fixed second valve port 554. The low elevation ridge may have an elevation for example between approximately 0.010-inch and 0.060-inch above the surface of the inset region 560.

Similarly, the face 566 of the rotating valve disc 556 may include a low-elevation raised region 568 formed to the same 0.010-inch to 0.060-inch dimension between the hub 574 and a ridge 570 formed at a radius just short of the inner-most radial dimensions of the first valve port in the rotating valve disc 556.

When assembled, any leakage is contained within the space between the inset region 560 of the thee 564 of the engine block 550 and the inner face 566 of the rotating valve disc 556 and bounded by the outer 560 and inner 570 edges of the inset region 560. This example may be identified as the combination of the ridge 562 around the (fixed) second port and the ridge 570 around the hub 574 of the rotating first valve port 558.

The embodiment illustrated in FIG. 37 is one example that reduces the required machining to a minimum by including it as part of the manufacture of the engine cylinder block 550 and the rotating valve disc 556. Thus, in one variation of the structure depicted in FIG. 37, the inset region may be formed in the outer face 564 of the wall of the engine cylinder block 550 and the inner face 566 of the rotating valve disc 556, such that the sealing apparatus comprises a circular ridge 570 formed on an inner face of the rotating valve disc 556 between a central hub 574 and the first port 558; and a circular inset region 560 disposed in an outer face 564 of the wall of the engine cylinder block 550 between the axle 572 and extending to the ridge 562 disposed at a radius just beyond the fixed second port 554.

In one variation of the structure depicted in FIG. 37, the inset region may be formed in the inner face 566 of the rotating valve disc 556 and the ridge or elevated feature formed in the outer face 564 of the wall of the engine cylinder block 550. Thus, the sealing apparatus may comprise a circular inset region disposed in an inner face of the rotating valve disc between the central hub 574 and extending to a radius just beyond the rotating first port 558; and a circular ridge formed on an outer face 564 of the wall of the engine cylinder block 550 between the axle 572 and the fixed second port 554.

The disclosed invention described therein eliminates the conventional camshaft and reciprocating valve train to control the timing of the intake and exhaust cycles of an internal combustion engine ("ICE") such as the well-known two or four cycle, spark ignition engines. The system includes intake and exhaust port valves for admitting the air/fuel mixture into the cylinder and exhausting the burned gases of combustion from the cylinder. It is important to note that the valve structure of the present invention ensures free and direct low through both the intake and exhaust valves when the valves are fully open, without obstruction to such flow by the open valve as in conventional poppet valve trains. The valve ports are located adjacent the engine cylinder and the timing of the valve operation is operated directly from the crankshaft, without any intervening valve train mechanism, thereby reducing the number of moving parts to a minimum. A camshaft is not needed, nor are lifters, pushrods, valve springs, valves with keepers and retaining washers, and features provided for adjusting valve clearances, nor any of the supporting structure required to support the components of a valve train, etc. Valve timing upon assembly is as simple as lining up two marks on the valve gear drive.

While the invention has been shown and described in only one of its forms, it is not thus limited but is susceptible to various changes and modifications without departing from the spirit thereof. For example, the rotating member containing the valve port (intake or exhaust) has been described in several examples as a valve gear even though other embodiments may employ a rotating disc that is configured with a different means of coupling it to the crankshaft rotation to preserve the necessary timing relationship between the crankshaft and the opening and closing of the valves.

In another example, a cylinder head may be configured with curved, tubular ports into the combustion chamber, wherein the respective inlet or outlet opening (of the intake or exhaust port) positioned just above the respective outer side of the cylinder and in the same plane as the adjoining valve port in the rotating disc. This would route the ports into the top of the cylinder instead of through the side wall of the cylinder, thereby simplifying the configuration of the cylinder portion of the engine block.

In yet another embodiment not depicted in the included drawings, the valve disc, instead of being formed as a ring gear, may be a rotating valve disc driven by a small gear attached to one face of the rotating valve disc and aligned on the axis of rotation of the valve disc, wherein the small gear is driven at one-half crankshaft speed by an intervening gear mechanism coupled to the crankshaft. Such an embodiment may reduce weight and wear due to the lower mass of the valve disc and the structure needed to rotate it at the required speed.

What is claimed is:

1. A valve system for an internal combustion piston engine having a crankshaft rotatably mounted in a crankcase portion of an engine block, comprising:
   an engine cylinder formed within said engine block and open at a lower end thereof into said crankcase portion, said engine cylinder having an intake port and an exhaust port formed in first and second sides thereof;
   wherein:
   an intake rotating port member comprising an annular sector aperture is disposed to rotate alongside said first side of said engine cylinder;
   an exhaust rotating port member comprising an annular sector aperture is disposed to rotate alongside said second side of said engine cylinder;
   such that each said intake rotating port member and said exhaust rotating port member is driven in synchronism with revolution of said crankshaft to align respectively in a communicating alignment with said intake port and said exhaust port formed through said opposite first sides of said engine cylinder and said second side of said engine cylinder;
   said annular sector apertures are each individually defined mathematically as a region between two concentric circles; and
   said concentric circles are defined mathematically as circles with a same center point origin or common center.

2. The valve system of claim 1, further comprising:
   at least one rotating drive member for coupling rotation of said crankshaft to rotation of each said rotating port member to control timing of said communicating alignment of said intake port and said exhaust port.

3. The valve system of claim 2, wherein said at least one rotating drive member comprises:
   a ring gear attached to said crankshaft aligned with the axis of said crankshaft and having a plurality of gear teeth around said ring gear that mesh with corresponding teeth formed around said intake rotating port member and said exhaust rotating port member.

4. The valve system of claim 3, wherein:
   the number of gear teeth around said rotating drive member equals half the number of gear teeth disposed around each said rotating port member such that said rotating drive member rotates two complete revolutions for each revolution of said rotating port member.

5. The valve system of claim 3, wherein:
   the number of gear teeth around said rotating drive member equals the number of gear teeth disposed around said rotating port member such that said rotating drive member rotates one complete revolution for each revolution of said rotating port member.

6. The valve system of claim 2, wherein each said rotating port member comprises:
   a rotating disc having a plurality of gear teeth disposed around the perimeter of said rotating disc configured to mesh with the gear teeth of the at least one said rotating drive member.

7. The valve system of claim 1, wherein
   said intake port and said exhaust port each comprise:
   a first aperture disposed through the upper portion of each respective first and second sides of said engine cylinder along a defined perimeter of said engine cylinder.

8. The valve system of claim 1, wherein said engine cylinder comprises:
   a hollow cylindrical member for enclosing a reciprocating piston coupled via a connecting rod to an offset journal of the crankshaft;
   wherein
   an outer portion of each first and second side of said engine cylinder is machined flat and configured to retain a sealing apparatus around the respective said intake and said exhaust ports.

9. The valve system of claim 8, wherein said sealing apparatus comprises:
   a compression ring and an oil ring disposed around each said intake and said exhaust port.

10. The valve system of claim 8, wherein said sealing apparatus comprises:
    a synthetic seal disposed in a groove surrounding each said intake and said exhaust port.

11. The valve system of claim 8, wherein said sealing apparatus comprises:
    a circular ridge formed on an inner face of each rotating port member between a central hub thereof and the respective said intake and said exhaust ports; and
    a circular inset region disposed in an outer face of the side of the engine cylinder between the central hub and extending beyond the radius of the respective said intake and said exhaust port.

12. The valve system of claim 10, wherein said sealing apparatus comprises:
    a circular inset region disposed in an inner face of each said rotating port member between a central hub thereof and extending beyond the radius of the respective said intake and said exhaust port; and
    a circular ridge formed on an outer face of the side of said engine cylinder surrounding the respective said intake and said exhaust port.

13. The valve system of claim 1, wherein:
    said intake port is configured for admitting air or an air/fuel mixture into said engine cylinder prior to a compression stroke of a piston reciprocating within said engine cylinder; and
    said exhaust port is configured for emitting burned air/fuel mixture out of said engine cylinder following a power stroke of a piston reciprocating within said engine cylinder.

14. A method for controlling valve timing in an internal combustion engine having a crankshaft rotatably mounted in a crankcase of an engine block, an engine cylinder formed within the engine block and open at a lower end thereof into the crankcase, and a combustion chamber formed in an upper end of the engine cylinder, comprising the steps of:

forming a first intake valve port and a first exhaust valve port in a respective side of said engine cylinder on opposite sides thereof and proximate said combustion chamber;

disposing in a first rotating port member adjacent said first intake valve port and a second rotating port member adjacent said first exhaust valve port, wherein said first rotating port member includes a second intake port comprising an annular sector aperture and the second rotating port member includes a second exhaust port comprising an annular sector aperture; and causing each respective first and second rotating port member to rotate in synchronism with said crankshaft such that the first and second intake ports said the first and second exhaust ports are respectively aligned at periodic intervals to permit passage of respective intake or exhaust substances respectively in or from said engine cylinder.

15. The method of claim 14, further comprising the steps of:

configuring said first rotating port member as a ring gear for cooperating with a rotating drive gear axially coupled to said crankshaft to control timing of an intake of an air-and-fuel mixture into said engine cylinder; and configuring said second rotating port member as a ring gear for cooperating with said rotating drive gear to control timing of an exhaust of combustion gases from said engine cylinder.

16. The method of claim 14, further comprising the steps of:

machining a face of each rotating port member adjacent the respective side of the engine cylinder to a predetermined surface finish; and configuring an outer portion of each respective side of said engine cylinder to retain a sealing apparatus around the respective first intake valve port and first exhaust valve port.

17. The method of claim 14, wherein the step of causing comprises the step of:

synchronizing the timing of the first and second intake valve ports to become aligned once for each two revolutions of the crankshaft to provide four cycle operation of said internal combustion engine.

18. The method of claim 14 wherein the step of causing comprises the step of:

synchronizing the timing of the first and second exhaust valve ports to become aligned once for each revolution of the crankshaft to provide two cycle operation of said internal combustion engine.

19. The valve system of claim 14 further comprising an intake multi-stage valve wherein:

said intake multi-stage valve is positioned between said intake rotating port member and said intake port in the wall of said engine cylinder and configured to vary the cross sectional area of a passage through said intake port into said engine cylinder.

20. The valve system of claim 14 further comprising an exhaust multi-stage valve wherein:

said exhaust multi-stage valve is positioned between said exhaust rotating port member and said exhaust port in the wall of said engine cylinder and configured to vary the cross sectional area of a passage through said exhaust port from said engine cylinder.

\* \* \* \* \*